(12) United States Patent
Sha et al.

(10) Patent No.: US 8,759,534 B2
(45) Date of Patent: Jun. 24, 2014

(54) TRIMETHINE CYANINE AND ITS USE

(75) Inventors: Chin-Kang Sha, Hsinchu (TW); Cheng-Fen Yang, Hsinchu (TW); Hsin-Jen Lee, Hsinchu (TW); Ching-Jung Chang, Hsinchu (TW)

(73) Assignee: Orgchem Technologies, Inc., Hsinchu (TW)

(*) Notice: Subject to any disclaimer, the term of this patent is extended or adjusted under 35 U.S.C. 154(b) by 0 days.

(21) Appl. No.: 13/441,587

(22) Filed: Apr. 6, 2012

(65) Prior Publication Data

US 2013/0060046 A1 Mar. 7, 2013

(30) Foreign Application Priority Data

Sep. 7, 2011 (TW) .............. 100132188 A

(51) Int. Cl.
  *C09B 23/06* (2006.01)
  *C09B 69/04* (2006.01)
  *C07D 401/14* (2006.01)

(52) U.S. Cl.
  USPC .............. 548/156; 548/427; 548/455

(58) Field of Classification Search
  None
  See application file for complete search history.

(56) References Cited

U.S. PATENT DOCUMENTS

| 5,773,193 | A | 6/1998 | Chapman et al. |
| 5,976,658 | A | 11/1999 | Tomizawa et al. |
| 2009/0076278 | A1 | 3/2009 | Dan-Oh et al. |

FOREIGN PATENT DOCUMENTS

| TW | 200736345 | 1/2007 |
| TW | 200706602 | 2/2007 |

OTHER PUBLICATIONS

Law, et al., "Dye-in-polymer films for ablative optical recording with GaAs diode lasers", Applied Physics Letters, vol. 39, No. 9, Nov. 1, 1981, pp. 718-720.

*Primary Examiner* — Nyeemah A Grazier
(74) *Attorney, Agent, or Firm* — Muncy, Geissler, Olds & Lowe, P.C.

(57) ABSTRACT

The present invention relates to a trimethine cyanine represented by the formula (1):

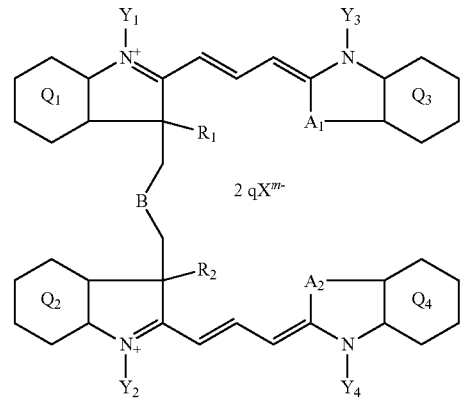

wherein all symbols are defined as in the specification.

9 Claims, No Drawings

TRIMETHINE CYANINE AND ITS USE

FIELD OF THE INVENTION

The invention relates to material for optical recording media, especially to novel cyanine compounds useful for high writing speed DVD-R optical recording media, their preparation and optical recording media having an optical recording layers formed from the cyanine compounds.

BACKGROUND OF THE INVENTION

Cyanine dye is an important organic dye, which can be applied to a variety of fields, such as textile, photosensitive science, excimer lasers, fluorescent probes and optical recording media. The first cyanine dye, synthesized by Grevill Williams in 1856, was originally used as a textile dye. Thereafter, in 1875 Vogel discovered the cyanine dye having special photosensitizing properties and thus being suitable to be used as a photosensitive material. Subsequently, the Cyanine dye was first proposed as a recording medium in optical disc by Law et al. (K. Y. Law, P. S. Vincett and G. E. Johnson, Appl. Phys. Lett., 39, 718 (1981)). Because the high molar extinction coefficient of the cyanine dye, the recording layer on an optical disc can be ablated clear pits even by applying a little energy (about 0.5 NJ/bit) and can impart the recording layer a higher signal noise ratio with relative high n value and suitable k value (see U.S. Pat. No. 5,976,658 and U.S. Pat. No. 5,773,193), and thereby produce high quality recordable discs (such as CD-R and DVD-R). The CD-R international standard (Orange Book) was initially established in accordance with the typical properties of the cyanine dye, and most of the CD-R burners were also designed by reference to the property of the cyanine dye as well. Later, phthalocyanine and azo dyes were continuously developed and used in CD-R recording media. Briefly speaking, the organic dyes are used as storage material in the recordable discs. The recording material containing such organic dyes can be coated onto the substrate through spin coating, which can shorten the process and reduce the cost as compared with the vacuum evaporation deposition method. Therefore, the stability of the organic dye and its solubility in organic solvent are very important.

For new generation of information and multimedia, storage media of high capacity, small in size and low production cost is demanded. Therefore, how to increase the storage density of optical storage media is one goal for research and development. CD-Rs possess the advantages of cheap in price, high burning and writing speed, convenient to carry and excellent compatibility with personal computers. As for the optical storage media, one of the most important processes which has been successfully developed is to shorten the reading and writing wavelength of the laser from the optical pickup head. For example, changing the pickup's laser from infrared laser to red light laser can be achieved by increasing the numerical aperture of the lens so that a recording media having high storage density, such as DVD-R disc is accordingly used. The wavelength for recording and playing DVD-R is about 650 nm, and its recording capacity of DVD-R is seven times of that of CD-R disc.

Dyes used for DVD-R should have adequate absorption at a wavelength of 650 nm and good solubility in organic solvents, especially in alcohol solvents. Among them, fluoroalcohols (such as 2,2,3,3-tetrafluoro-1-propanol, TFP) are the most commonly used solvents in the optical disc preparation process. The dye is required to have sufficiently high reflectivity and stability upon forming into a film in order to have a long term data storage stability. Other than the absorption at the desire wavelength, increasing the writing speed of DVD-R from low speed (1×~8×) to high speed (12×~16×) also required. The properties of the recording layer become even more important when the recoding disc is recorded at a much high writing speed. This is because if the optical disc is written at high writing speed, the shortened writing time thus requires the media to have much higher sensitivity. In addition, high writing speed accomplished by using high power laser irradiation will results in narrower in the writing margin along with problems especially poor jitter feature, increasing of the laser power and so on. Therefore, much efforts have devoted to develop novel recording material by modifying the structure of the dye such that the thermal decomposition property and ablating speed of DVD-R optical disc can be improved. Generally, the dye used in optical recording media possesses a conjugated system in the molecule as a main characteristic, wherein the skeleton of the chemical structure determines their main absorption range. Semi-empirical molecular orbital calculation methods, such as EHMO, PPP, CNDO and MNDO, can be used in designing new dye. Among them, the PPP method is considered to be the best method for calculating the absorption wavelength of the dye molecules. Since the relationship between the molecular structure of the dye and its other properties (especially thermal performance) is still not well established, selection of dyes suitable for recording material still relies on experimentation.

Among the dye for use in the recording layer of the DVD-R optical disc, cyanine dye has better competitive advantages in the market due to its good coating processability and good solubility in solvents. Prior art such as Taiwan Patent Publication No. 200706602 and No. 200736345 discloses cyanine dimer compounds having improved ablating properties. The novel trimethine dimer compound for use as recording media disclosed in Taiwan Patent Publication No. 200706602 has good characteristics of high recording speed, excellent sensitivity and small thermal interference when forming pits. Taiwan Patent Publication No. 200736345 discloses methine dyes which have a bis-indolenine skeleton and can absorb light in the ultra violet and the infrared regions. The methine dyes have excellent light stability, heat resistance, low jitter and excellent sensitivity. In addition, compared to conventionally known relevant compounds of having solubility in TFP (tetrafluoropropanol) being less than 1.10 wt. %, the solubility of the compound disclosed in Taiwan Patent Publication No. 200736345 is up to 2.68 wt. %.

In recent years, the global economy is booming, but the mineral resource is relatively limited, which results in soaring price of raw material. TFP, the essential solvent used in the optical disc manufacturing process, is thus in a skyrocketing price and makes the production cost for optical disc to rise significantly. To reduce the amount of TFP used in the optical disc manufacturing process becomes an important issue to be resolve. Therefore, there is a great demand for developing optical disc dyes having excellent solubility in this solvent.

SUMMARY OF THE INVENTION

To solve the above mentioned problems, the present invention provides trimethine cyanine compounds (hereinafter sometimes referred to "the present cyanine compound" briefly), which are useful as an optical recording material. The inventors unexpectedly discovered the present cyanine compounds possessing advantages of low decomposition temperature and good solubility in organic solvents (such as TFP). In addition, due to the low decomposition temperature, the present cyanine compounds can be used for forming an optical recording layer in optical recording media, especially in high speed ablation. Therefore, it is suitable to be use in high speed writing DVD-R disc (i.e. recordable disc).

Therefore, the present invention provides a trimethine cyanine compound represented by the following formula (1):

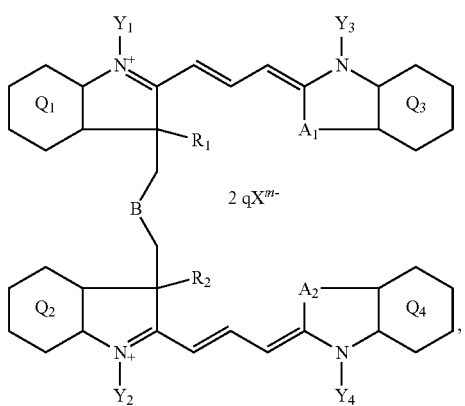

wherein:
$Q_1$, $Q_2$, $Q_3$, and $Q_4$ are the same or different and each represents a substituted or unsubstituted benzene ring or naphthalene ring;
$A_1$ and $A_2$ are the same or different and each represents a group of formulae

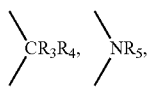

an oxygen atom, or a sulfur atom;
$Y_1$, $Y_2$, $Y_3$, and $Y_4$ are the same or different and each represents an organic group having 1 to 18 carbon atoms;
$R_1$, $R_2$, $R_3$, $R_4$, and $R_5$ are the same or different and each represents a hydrocarbon group having 1-18 carbon atoms, which is substituted or unsubstituted; alternatively, $R_3$ and $R_4$ can be combined each other to form a 3- to 6-member carbon ring which can further be fused with a benzene ring;
B is a divalent linking group represented by the following formula (a) or (b):

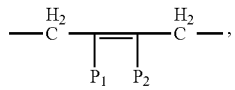

in the formula (a):
$P_1$ and $P_2$ are the same or different and each represents a hydrogen atom or an organic group having 1 to 8 carbon atoms; alternatively, $P_1$ and $P_2$ can be combined each other to form a 3- to 6-member carbon ring which can further be fused with a benzene ring;

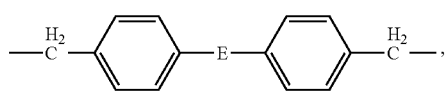

in the formula (b):
E is an oxygen atom, a sulfur atom,

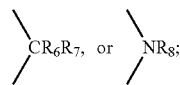

$R_6$, $R_7$ and $R_8$ each represents a hydrogen atom or a hydrocarbon group having 1 to 18 carbon atoms; alternatively, $R_6$ and $R_7$ can be combined each other to form a 3- to 6-member carbon ring;
$X^{m-}$ represents an anion having m valence;
m represents an integral of 1, 2, or 3;
q represents the number attributing the compound with electronic neutrality.

The present invention also provides an optical recording medium, which is characterized in that the recording layer of the optical recording media comprises the trimethine cyanine compound (1) according to the present invention.

The present invention further provides a method for producing the trimethine cyanine compound (1) according to present invention, comprising coupling an indolium salt of formula (10) with an indolium derivative of formula (11) to form an trimethine cyanine compound of formula (12),

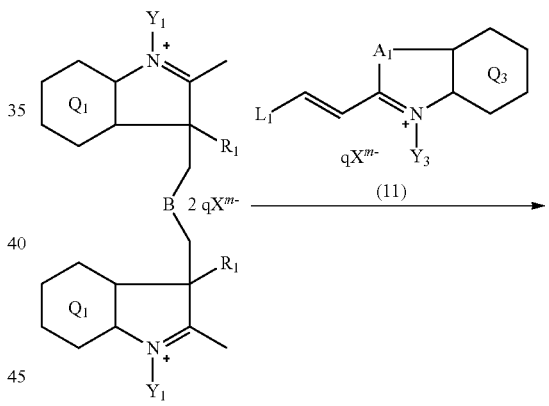

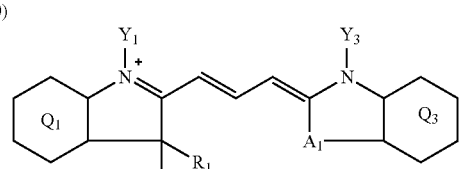

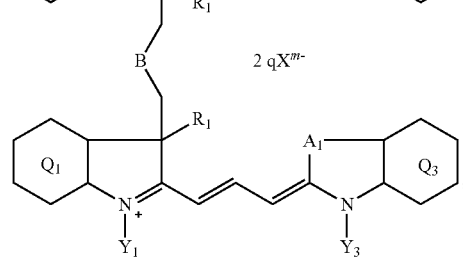

wherein $L_1$ is a leaving group, and $Q_1$, $Q_3$, $A_1$, B, $R_1$, $Y_1$, $Y_3$, $X^{m-}$, m and q are defined as above.

DETAILED DESCRIPTION OF THE INVENTION

The Trimethine Cyanine Compounds of the Present Invention

One aspect of the present invention is to provide a trimethine cyanine compound represented by the following formula (1):

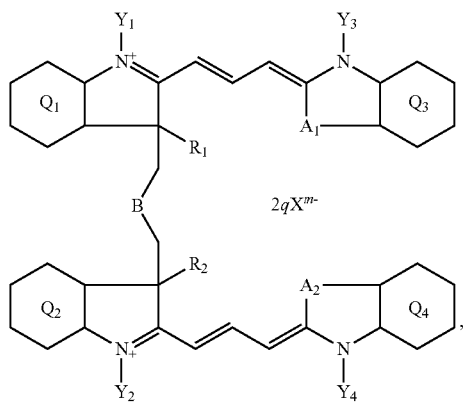

(1)

wherein:

$Q_1$, $Q_2$, $Q_3$, and $Q_4$ are the same or different and each represents a substituted or unsubstituted benzene ring or naphthalene ring;

$A_1$ and $A_2$ are the same or different and each represents a group of formulae

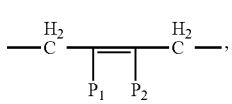

an oxygen atom, or a sulfur atom;

$Y_1$, $Y_2$, $Y_3$, and $Y_4$ are the same or different and each represents an organic group having 1 to 18 carbon atoms;

$R_1$, $R_2$, $R_3$, $R_4$, and $R_5$ are the same or different and each represents a hydrocarbon group having 1-18 carbon atoms, which is substituted or unsubstituted; alternatively, $R_3$ and $R_4$ can be combined each other to form a 3- to 6-member carbon ring which can further be fused with a benzene ring;

B is a divalent linking group represented by the following formula (a) or (b):

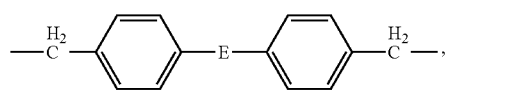

(a)

in formula (a):

$P_1$ and $P_2$ are the same or different and each represents a hydrogen atom or an organic group having 1 to 8 carbon atoms; alternatively, $P_1$ and $P_2$ can be combined each other to form a 3- to 6-member carbon ring which can further be fused with a benzene ring;

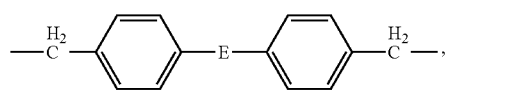

(b)

in formula (b):

E is an oxygen atom, a sulfur atom,

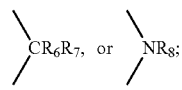

$R_6$, $R_7$ and $R_8$ each represents a hydrogen atom or a hydrocarbon group having 1 to 18 carbon atoms; alternatively $R_6$ and $R_7$ can be combined each other to form a 3- to 6-member carbon ring;

$X^{m-}$ represents an anion having m valence;

m represents an integral of 1, 2, or 3;

q represents the number attributing the compound with electronic neutrality.

According to the present invention, the compound of formula (1) is a trimethine cyanine compound represented by the following formula (2):

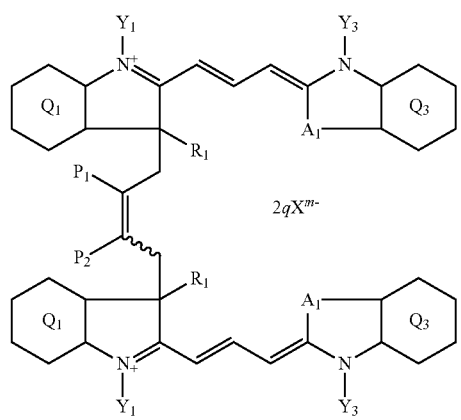

(2)

wherein:

$Q_1$ and $Q_3$ are the same or different and each represents a substituted or unsubstituted benzene ring or naphthalene ring;

$P_1$ and $P_2$ are the same or different and each represents a hydrogen atom or an organic group having 1 to 18 carbon atoms; alternatively $P_1$ and $P_2$ can be combined each other to form a 3-to 6-member carbon ring which can further be fused with a benzene ring;

$A_1$ is

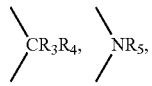

an oxygen atom, or a sulfur atom;

$Y_1$ and $Y_3$ are the same or different and each represents an organic group having 1 to 18 carbon atoms;

$R_1$, $R_3$, $R_4$, and $R_5$ are the same or different and each represents a hydrocarbon group having 1-18 carbon atoms, which is substituted or unsubstituted; alternatively $R_3$ and $R_4$ can be combined each other to form a 3- to 6-member carbon ring which can further be fused with a benzene ring;

$X^{m-}$ represents an anion having m valence;

m represents an integral of 1, 2, or 3;

q represents the number attributing the compound with electronic neutrality.

According to the present invention, the compound of formula (1) is a trimethine cyanine compound represented by the following formula (3):

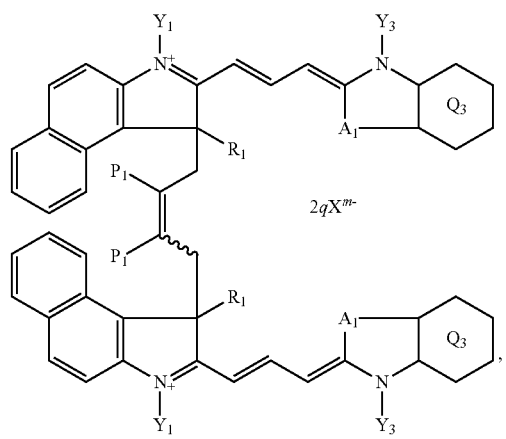

(3)

wherein:

$Q_3$ is a substituted or unsubstituted benzene ring or naphthalene ring;

$P_1$ is a hydrogen atom or an organic group having 1 to 8 carbon atoms;

$A_1$ is

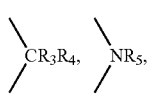

an oxygen atom, or a sulfur atom;

$Y_1$ and $Y_3$ are the same or different and each represents an organic group having 1 to 18 carbon atoms;

$R_1$, $R_3$, $R_4$, and $R_5$ are the same or different and each represents a hydrocarbon group having 1-8 carbon atoms, which is substituted or unsubstituted; alternatively $R_3$ and $R_4$ can be combined each other to form a 3- to 6-member carbon ring which can further be fused with a benzene ring;

$X^{m-}$ represents an anion having m valence;

m represents an integral of 1, 2, or 3;

q represents the number attributing the compound with electronic neutrality.

According to the present invention, the compound of formula (1) is a trimethine cyanine compound represented by the following formula (4):

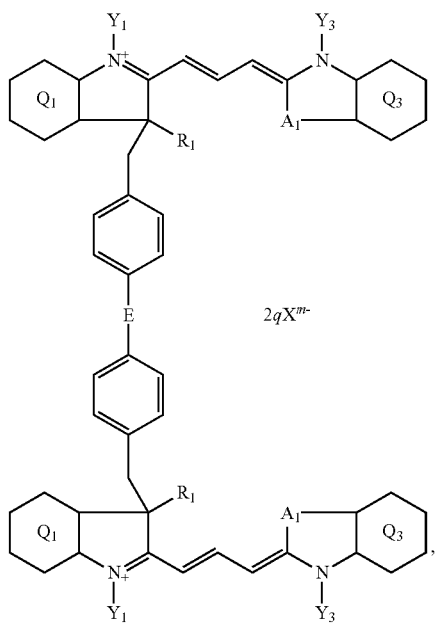

(4)

wherein:

$Q_1$ and $Q_3$ are the same or different and each represents a substituted or unsubstituted benzene ring or naphthalene ring;

$A_1$ is

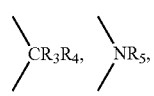

an oxygen atom, or a sulfur atom;

$Y_1$ and $Y_3$ are the same or different and each represents an organic group having 1 to 18 carbon atoms;

E is an oxygen atom, a sulfur atom,

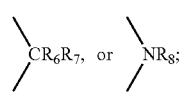

$R_1$, $R_3$, $R_4$, $R_5$, $R_6$, $R_7$ and $R_8$ are the same or different and each represents a hydrocarbon group having 1-18 carbon atoms, which is substituted or unsubstituted; alternatively $R_3$ and $R_4$ can be combined each other to form a 3- to 6-member carbon ring which can further be fused with a benzene ring; alternatively $R_6$ and $R_7$ can be combined each other to form a 3- to 6-member carbon ring;

$X^{m-}$ represents an anion having m valence;

m represents an integral of 1, 2, or 3;

q represents the number attributing the compound with electronic neutrality.

According to the present invention, the compound of formula (1) is a trimethine cyanine compound represented by the following formula (5):

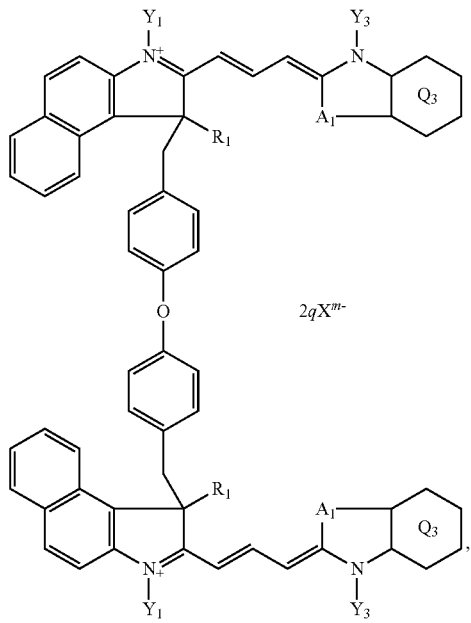

(5)

wherein:

$Q_3$ is a substituted or unsubstituted benzene ring or naphthalene ring;

$A_1$ is

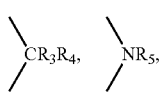

an oxygen atom, or a sulfur atom;

$Y_1$ and $Y_3$ are the same or different and each represents an organic group having 1 to 18 carbon atoms;

$R_1$, $R_3$, $R_4$, $R_5$ are the same or different and each represents a hydrocarbon group having 1-18 carbon atoms, which is substituted or unsubstituted; alternatively $R_3$ and $R_4$ can be combined each other to form a 3- to 6-member carbon ring which can further be fused with a benzene ring;

$X^{m-}$ represents an anion having m valence;

m represents an integral of 1, 2, or 3;

q represents the number attributing the compound with electronic neutrality.

According to the present invention, the compound of formula (1) is a trimethine cyanine compound represented by the following formula (6):

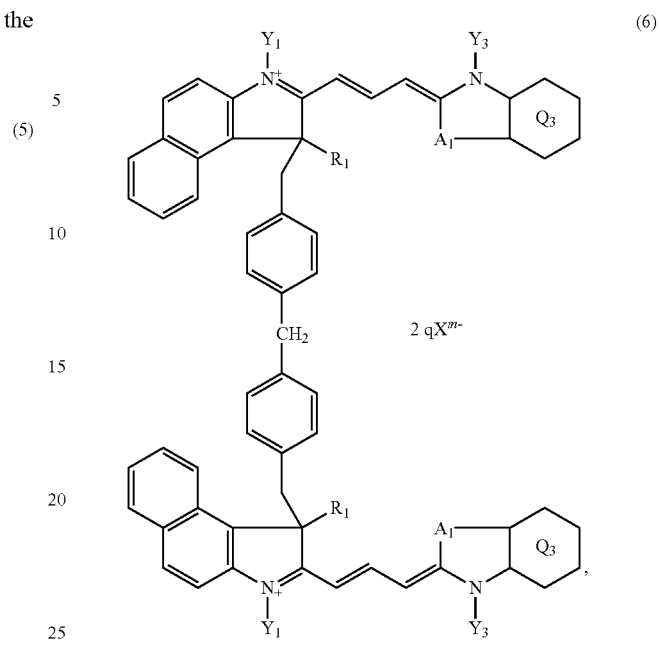

(6)

wherein:

$Q_3$ is a substituted or unsubstituted benzene ring or naphthalene ring;

$A_1$ is

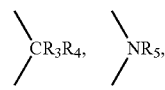

an oxygen atom, or a sulfur atom;

$Y_1$ and $Y_3$ are the same or different and each represents an organic group having 1 to 18 carbon atoms;

$R_1$, $R_3$, $R_4$, $R_5$ are the same or different and each represents a hydrocarbon group having 1-18 carbon atoms, which is substituted or unsubstituted; or $R_3$ and $R_4$ are combined to form a 3- to 6-member carbon ring which can further be fused with a benzene ring;

$X^{m-}$ represents an anion having m valence;

m represents an integral of 1, 2, or 3;

q represents the number attributing the compound with electronic neutrality.

Among the compounds of formula (1) to (6) of the present invention, $Q_1$, $Q_2$, $Q_3$, and $Q_4$ are the same or different and each represents a substituted or unsubstituted benzene ring or naphthalene ring. The term "substituted or unsubstituted benzene ring or naphthalene ring" refers to a benzene ring or a naphthalene ring having hydrogen atoms optionally substituted by substituents. The substituent is selected from the group consisting of halogen atoms (such as fluorine, chlorine, bromine, and iodide atoms), alkyl groups (such as methyl, ethyl, propyl, isopropyl, n-butyl, isobutyl, sec-butyl, tert-butyl, n-pentyl, isopentyl, tert-pentyl, cyclopentyl, n-hexyl, cyclohexyl, heptyl, octyl group), aryl group (such as phenyl, naphthyl, 4-methylphenyl groups), alkoxy group (such as methoxy, ethoxy, n-propoxy, isopropoxy, n-butoxy), alkylthio group (such as methylthio, ethylthio, n-propylthio, isopropylthio, n-butylthio groups), nitro group and cyano group.

Among the compounds of formula (1) to (6) of the present invention, $Y_1$, $Y_2$, $Y_3$, and $Y_4$ are the same or different and each represents an organic group having 1 to 18 carbon atoms; preferably an organic group having 1 to 10 carbon atoms. The term "organic group" refers to a group consisting of carbon atoms and hydrogen atoms, such as $C_{1-18}$ alkyl, $C_{2-18}$ alkenyl, $C_{2-18}$ alkynyl, $C_{7-12}$ arylalkyl, $C_{7-12}$ alkylaryl, $C_{3-18}$ cycloalkyl, $C_{3-18}$ cycloalkenyl, phenyl, or biphenylyl, etc., and preferably methyl, ethyl, n-propyl, isopropyl, 2-propenyl, ethynyl, 2-propynyl, n-butyl, isobutyl, sec-butyl, tert-butyl, 2-butenyl, n-pentyl, isopentyl, neopentyl, tert-pentyl, 1-methylpentyl, 2-methylpentyl, 2-pentenyl, 2-penten-4-ynyl, n-hexyl, isohexyl, 5-methylhexyl, heptyl, octyl, benzyl, phenylethyl, 2-phenylpropyl, 3-phenylpropyl, aryl such as phenyl, o-tolyl, m-tolyl, p-tolyl, 2,4-dimethylphenyl, 2,6-dimethylphenyl, 2,4,6-trimethylphenyl, o-methoxyphenyl, m-methoxyphenyl, p-methoxyphenyl, and biphenylyl.

Among the compounds of formula (1) to (6) of the present invention, $P_1$ and $P_2$ are the same or different and each represents a hydrogen atom or an organic group having 1 to 18 carbon atoms. The term "organic group" refers to a group consisting of carbon atoms and hydrogen atoms, such as $C_{1-8}$ alkyl, $C_{2-8}$ alkenyl, $C_{2-8}$ alkynyl, $C_{7-8}$ arylalkyl, $C_{7-8}$ alkylaryl, $C_{3-8}$ cycloalkyl, $C_{3-8}$ cycloalkenyl or phenyl, etc. The organic group can be substituted by one or more substituents, wherein the substituent is selected from alkyl (such as methyl, ethyl, n-propyl, isopropyl, n-butyl, isobutyl, 2-butyl, tert-butyl, n-pentyl, isopentyl, sec-pentyl, tert-pentyl, 2-methylbutyl, 3-methyl-2-butyl, cyclopentyl, cyclohexyl), alkenyl (such as vinyl, 1-propenyl, 2-propenyl, 2-methylpropenyl, 2-butenyl, 3-butenyl, cinnamyl), alkynyl (such as 1-propargyl, 2-propargyl, 2-butynyl, 3-butynyl), aryl (such as phenyl, naphthyl, o-tolyl, m-tolyl, p-tolyl, 2,4-dimethylpenyl, 2,6-dimethylphenyl, o-methoxyphenyl, m-methoxyphenyl, p-methoxyphenyl), or arylalkyl (such as benzyl, phenylethyl, o-methoxybenzyl, m-methoxybenzyl, p-methoxybenzyl).

Among the compounds of formula (1) to (6) of the present invention, $A_1$ and $A_2$ are the same or different and each represents a group of formulae

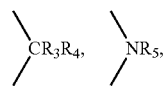

an oxygen atom, or a sulfur atom. $R_3$, $R_4$, and $R_5$ are the same or different and each represents a hydrocarbon group having 1-18 carbon atoms, which is substituted or unsubstituted. Specifically, $R_3$, $R_4$, and $R_5$ are the same or different and each represents substituted or unsubstituted $C_{1-18}$ alkyl, $C_{2-18}$ alkenyl, $C_{2-18}$ alkynyl, aryl, arylalkyl, monocyclic hydrocarbon or multicyclic hydrocarbon; alternatively $R_3$ and $R_4$ can be combined each other to form a 3- to 6-member carbon ring which can further be fused with a benzene ring. The above mentioned alkyl, for example, can be methyl, ethyl, n-propyl, isopropyl, n-butyl, isobutyl, sec-butyl, tert-butyl, n-pentyl, isopentyl, sec-pentyl, tert-pentyl, cyclopentyl, n-hexyl, cyclohexyl, heptyl or octyl. The above mentioned alkenyl, for example, can be propenyl, 2-methylpropenyl, 2-butenyl, 3-butenyl or cinnamyl. The above mentioned alkynyl, for example, can be propargyl, 2-butynyl or 3-butynyl. The above mentioned aryl, for example, can be phenyl, naphthyl, o-tolyl, m-tolyl, p-tolyl, 2,4-dimethylpenyl, 2,6-dimethylphenyl, 2,4,6-trimethylphenyl or biphenylyl. The above mentioned arylalkyl, for example, can be benzyl, phenylethyl, 2-phenylpropyl, o-methoxybenzyl, m-methoxybenzyl or p-methoxybenzyl. Those groups can be further substituted with one or more substitutents, and the substitutents, for example, can be alkoxyl group (such as methoxy, trifluoromethoxy, ethoxy, propoxy, isopropoxy, butoxy, tert-butoxy or pentoxy); aryloxy group (such as phenoxy); aralkyloxy group (such as benzyloxy); alkoxycarbonyl group (such as methoxycarbonyl, trifluoromethoxycarbonyl, ethoxycarbonyl, propoxycarbonyl); alkanoyloxy group (such as acetyloxy, trifluoroacetyloxy); halogen group (such as fluorine, chlorine, bromine or iodine); amido group; carboxy group; keton group; aldehyde group; nitrile group; nitro group; sulfone group; sulfoxide group; or heterocyclic group (such as furyl, pyrrolyl, thienyl, pyridyl, and indolyl groups).

In the compounds of formula (1) to (6), $R_1$ and $R_2$ are defined as $R_3$, $R_4$ and $R_5$.

In the compounds of formula (1) to (6), $R_6$, $R_7$ and $R_8$ are defined as $R_3$, $R_4$ and $R_5$.

In the compounds of formula (1) to (6), $X^{m-}$ represents an anion having m valence. The species of anion has no limitation, and is selected depending on the final use and the physical properties of the trimethine cyanine compound, such as solubility in solvent (such as 2,2,3,3-tetrafluoro-1-propanol (TFP)), heat-resistance, stability, and explosion, etc. Examples of the anion include but not limited to halide (such as iodide, bromide, chloride, or fluoride); inorganic acid ion (such as phosphate ion, perchlorate ion, periodate ion, hexafluorophosphate ion, hexafluoroantimonate ion, hexafluorostannate ion or tetrafluoroborate ion); organic acid ion (such as thiocyanate ion, benzenesulfonate ion, naphthylsulfonate ion, p-tolylsulfonate ion, ethylsulfonate ion, benzoate ion, trifluoroacetate ion, trichloroacetate, methanesulfonate ion or trifluoromethanesulfonate ion); organic metal coordinating anion (such as azo metal coordinating anion, bisphenyldithiol chealate, thiocatechol chealate, thiobisphenorate chealate).

Among them, the preferable counterion is the coordinating counterion containing fluoroine and element of Group 5A in the Element Periodic Table, such as phosphine, antimony, and bismuth (such as hexafluorophosphate ion and hexafluoroantimonate ion); and azo metal coordinating anion. By carrying such anions, the trimethine cyanine compound of the present inventionfor use as a dye exhibits relative high heat-resistance, easy operation, and good solubility in solvent such as TFP.

In addition, the above mentioned organic metal coordinating anion generally exhibits excellent ability of quenching singlet oxygen and thus exhibits excellent light-resistance and weather-resistance when using as a recording layer in an optical recording medium. Among the above mentioned organic metal coordinating anion, the azo metal coordinating anion and bisphenyldithiol chealate are commonly used and mentioned in, for example, Taiwan Patent Publication Nos. 434245, 493171, 572969, and US Patent Publication NOs. 4713314, 5268478, and Japanese Patent Laid-open Publication No. JP6-239028. Examples of the azo metal coordinating anion and bisphenyldithiol chelate are represented by the following formulae (7), (8), and (9), respectively:

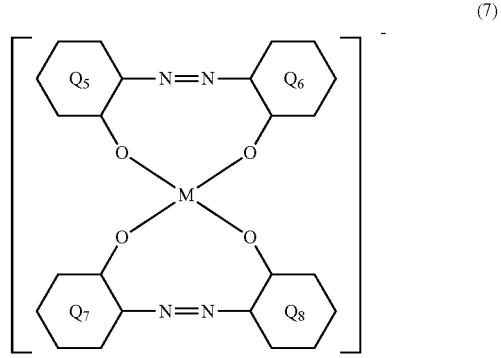

-continued

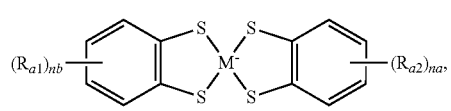
(8)

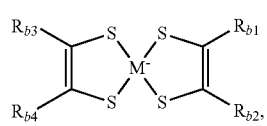
(9)

wherein $Q_5$, $Q_6$, $Q_7$, and $Q_8$ are the same and different and each represents a substituted or unsubstituted benzene ring or heteroaryl group; $R_{a1}$, $R_{a2}$, $R_{b1}$, $R_{b2}$, $R_{b3}$, and $R_{b4}$ each represents an alkyl group, an aryalkyl group, or an aryl group; na and nb each represents 0, 1, 2, 3, or 4.

The trimethine cyanine compounds of formula (1), (2), (3), (4), (5) or (6) of the present invention is, for example, the following compounds, but not limited thereto.

-continued

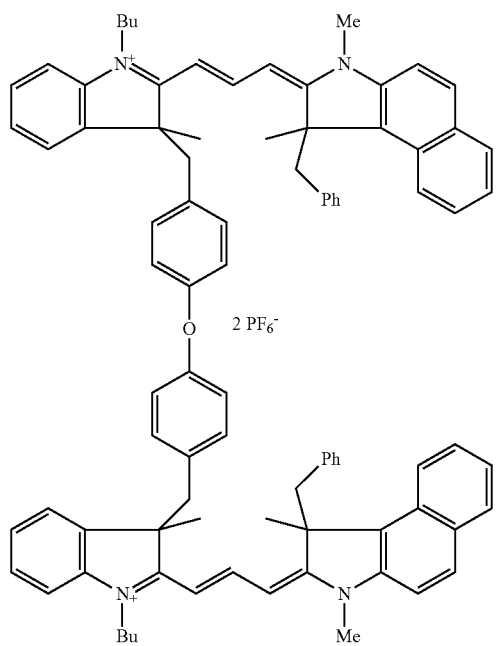
Compound no. 2

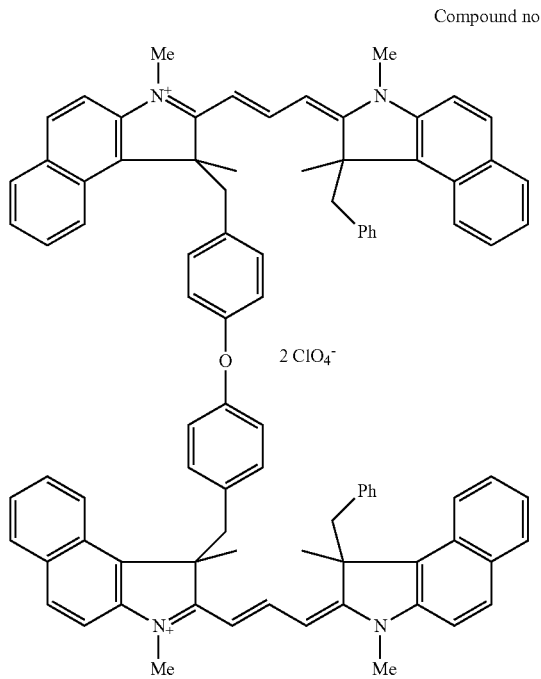
Compound no. 1

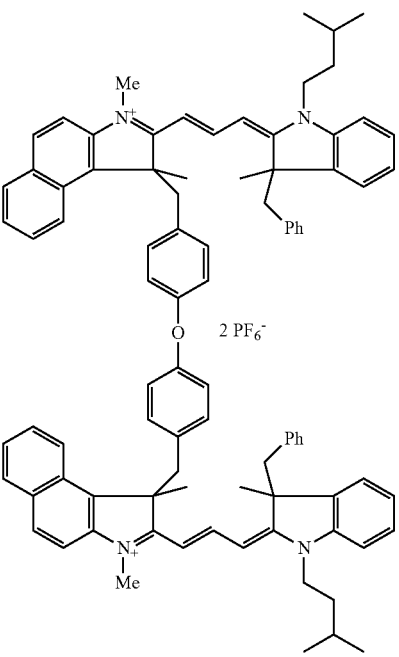
Compound no. 3

Compound no. 4
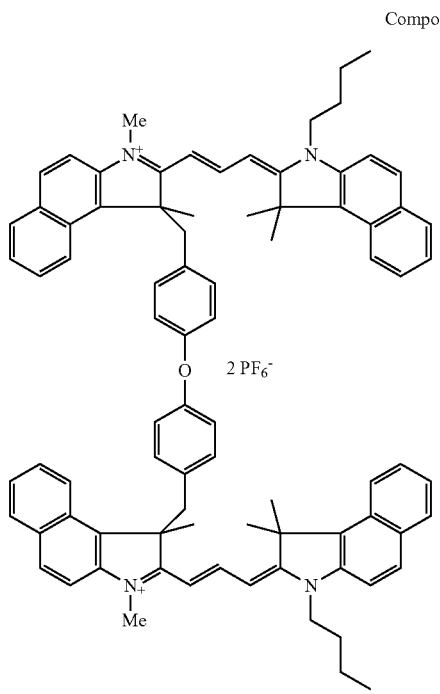
Compound no. 6
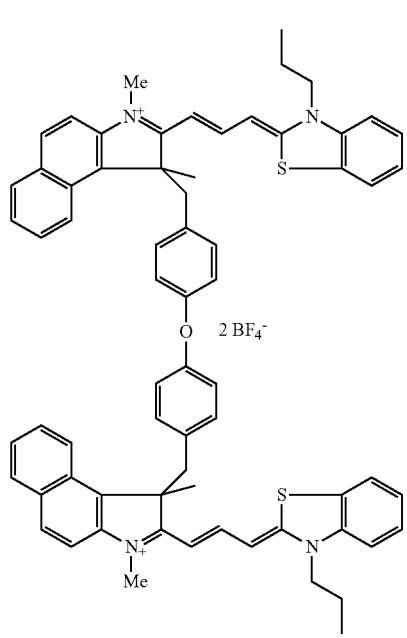
Compound no. 5
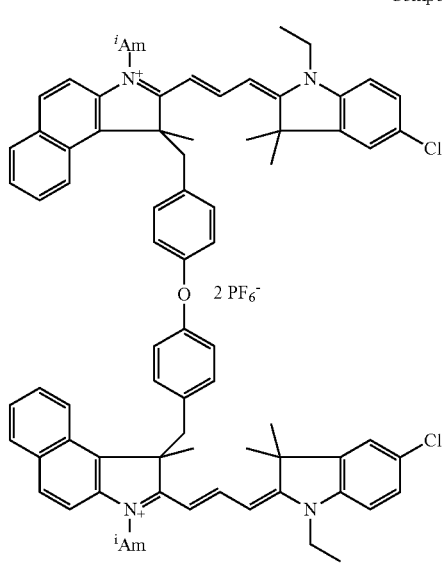
Compound no. 7
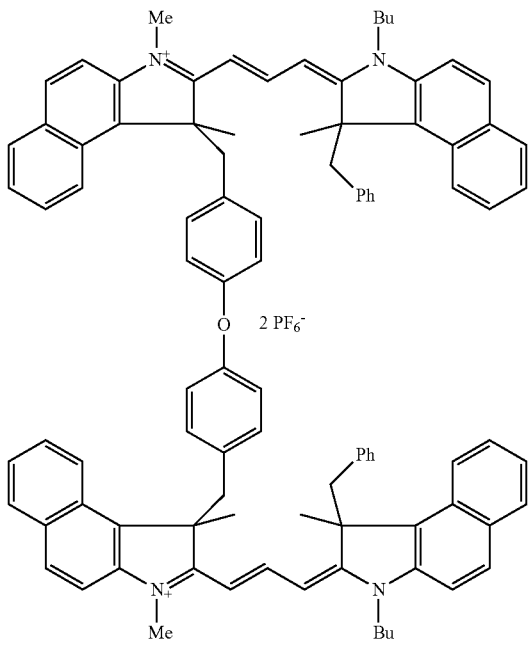

Compound no. 8
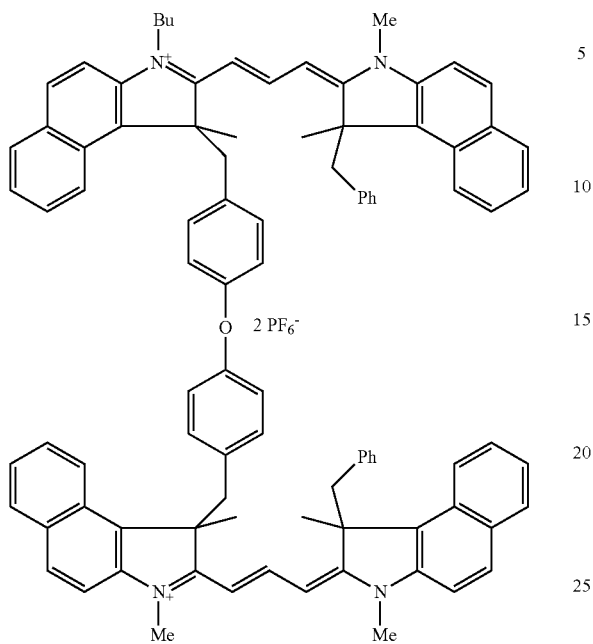
Compound no. 10
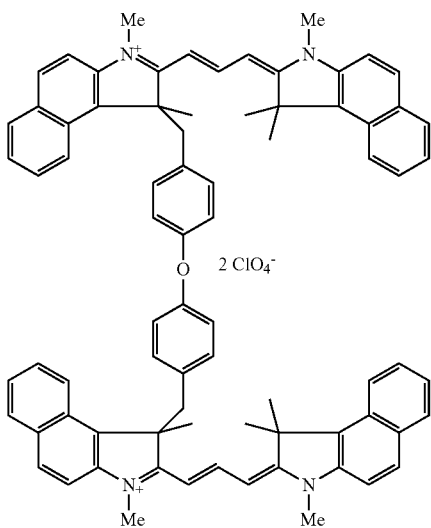
Compound no. 9
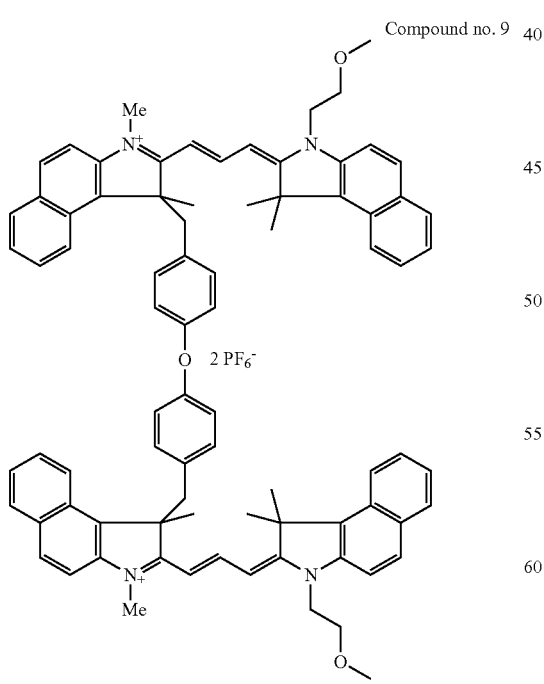
Compound no. 11
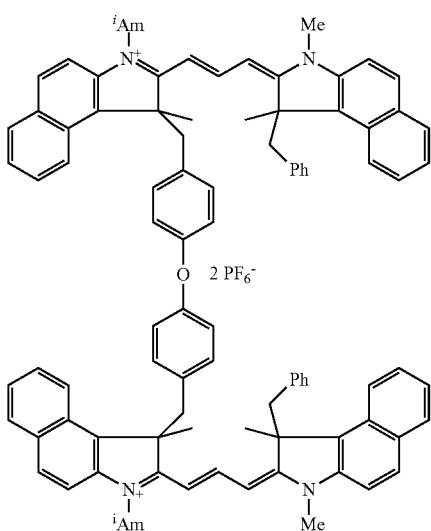

Compound no. 12
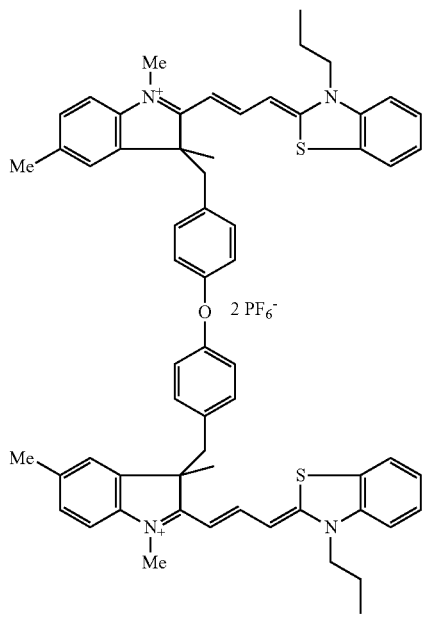
Compound no. 14
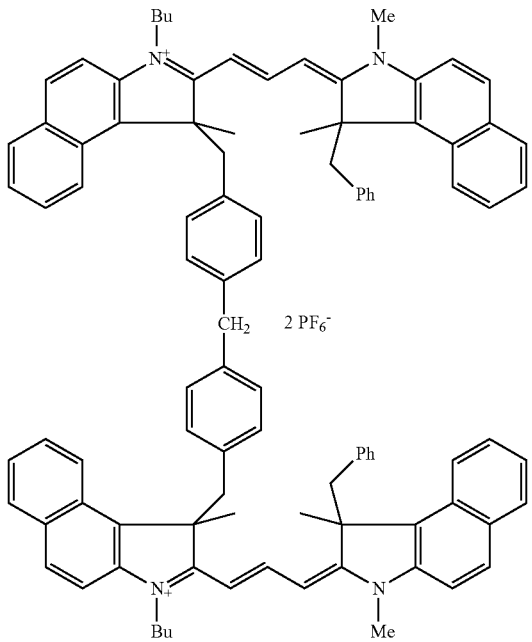
Compound no. 13
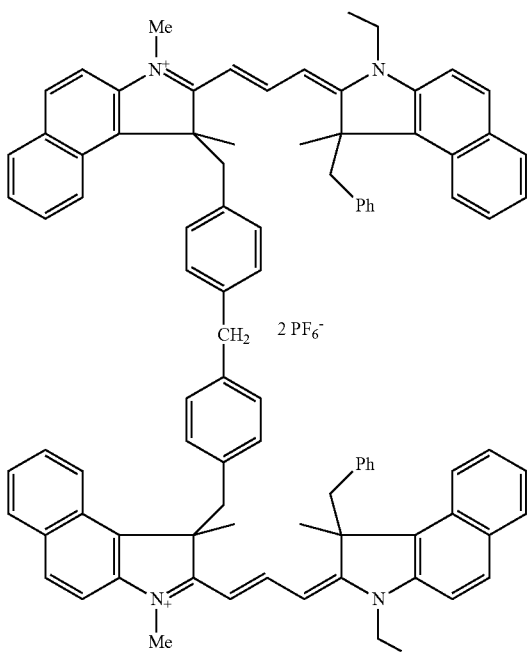
Compound no. 15
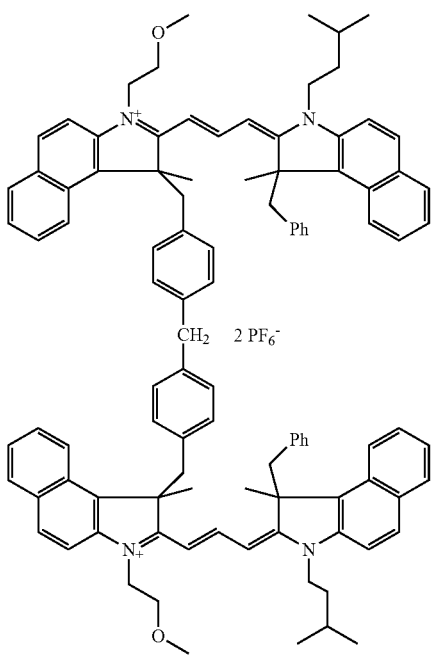

Compound no. 16
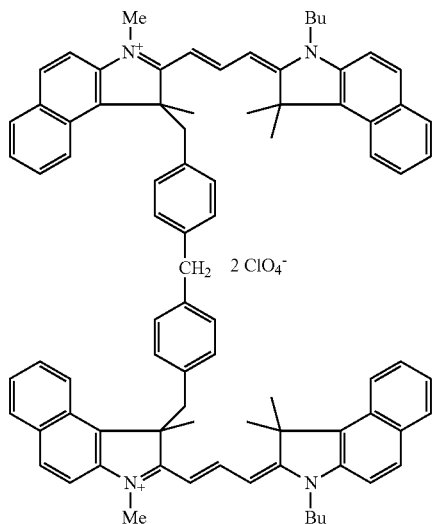
Compound no. 17
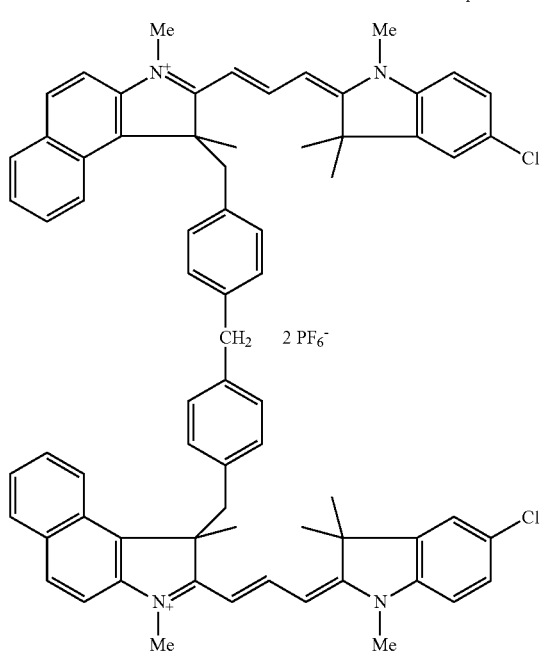
Compound no. 18
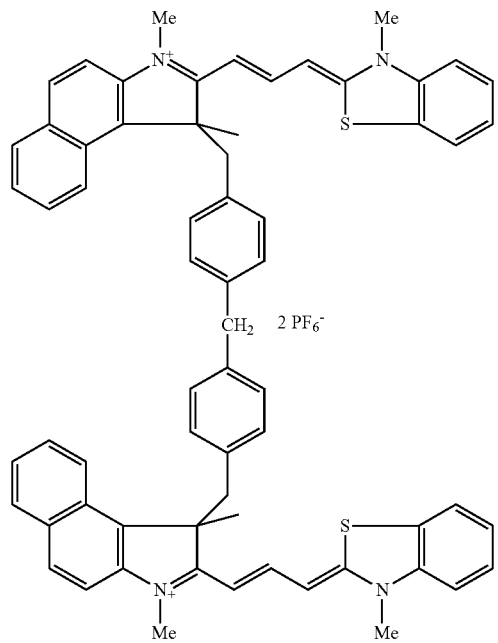
Compound no. 19
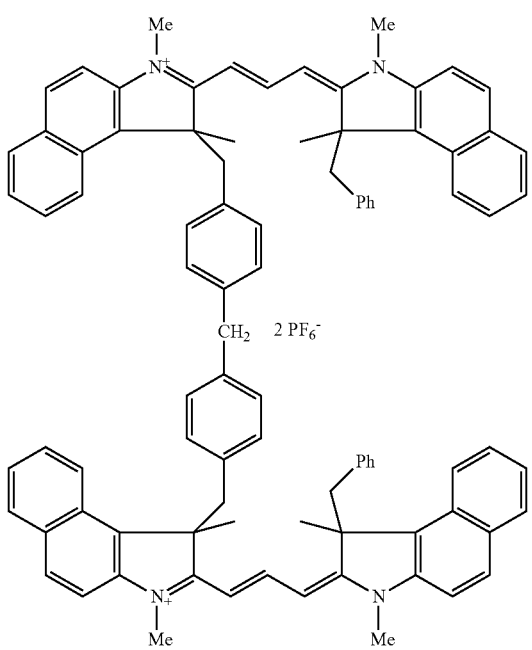

Compound no. 20
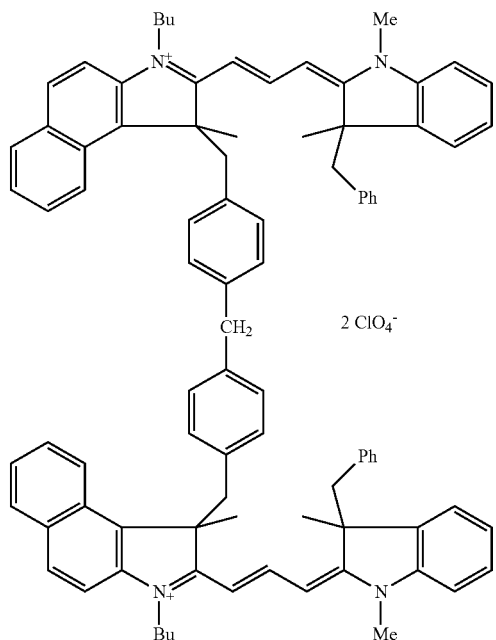
2 ClO$_4^-$
Compound no. 22
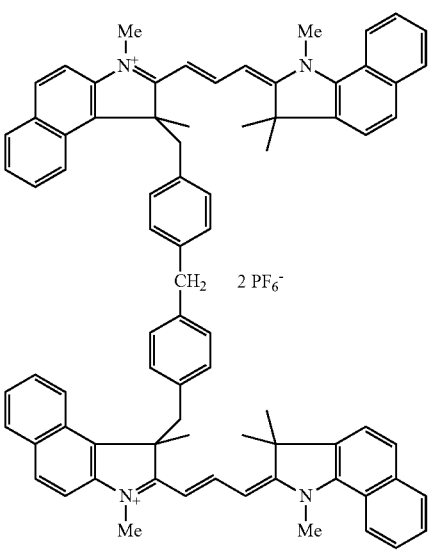
2 PF$_6^-$
Compound no. 21
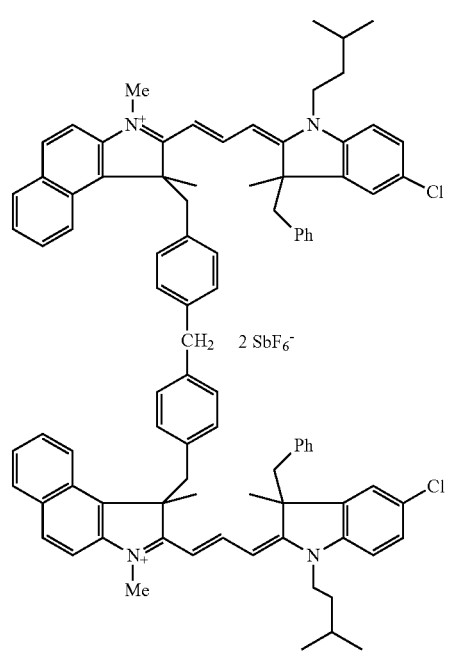
2 SbF$_6^-$
Compound no. 23
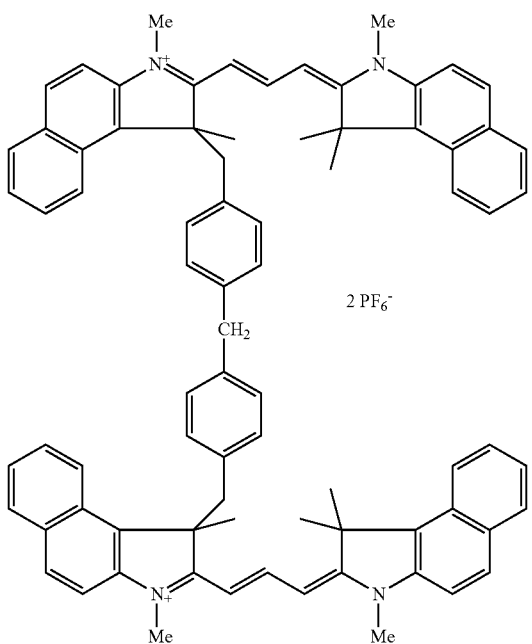
2 PF$_6^-$ Compound no. 24
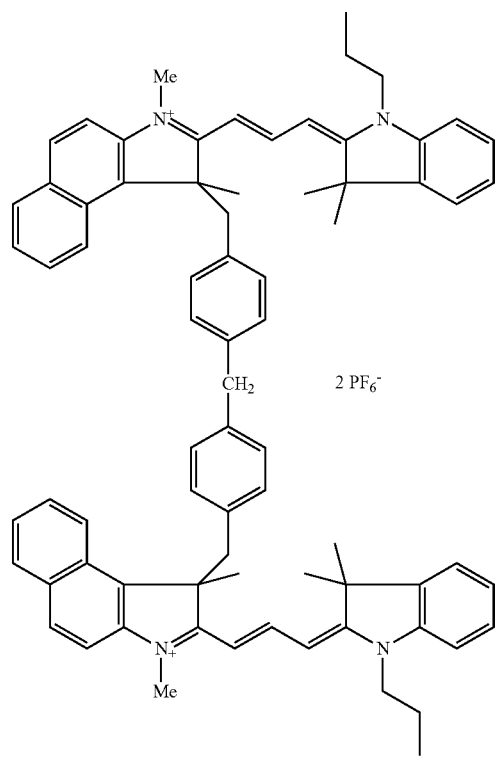
Compound no. 25
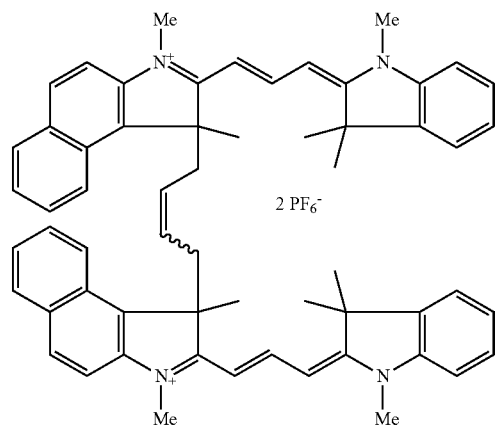
Compound no. 26
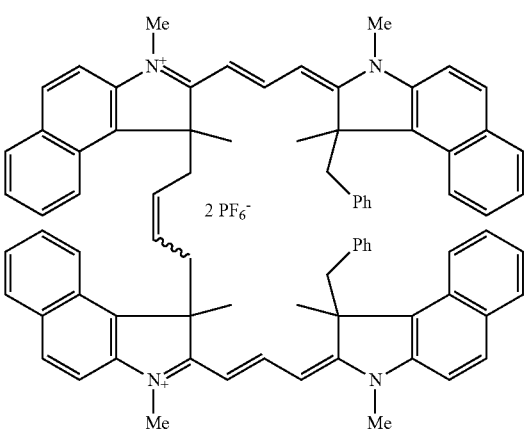
Compound no. 27
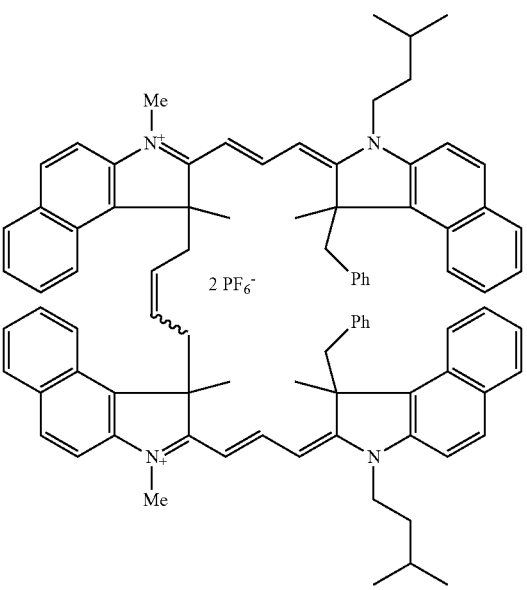
Compound no. 28
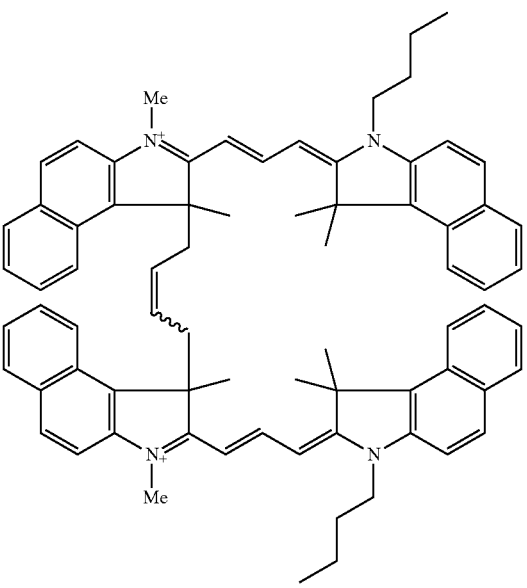

Compound no. 29
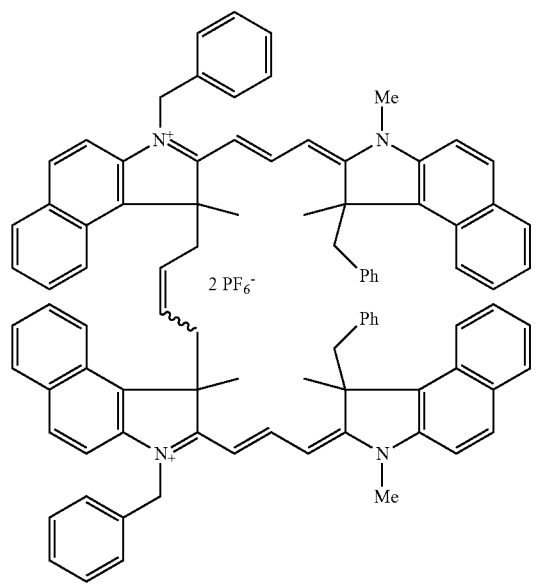
Compound no. 30
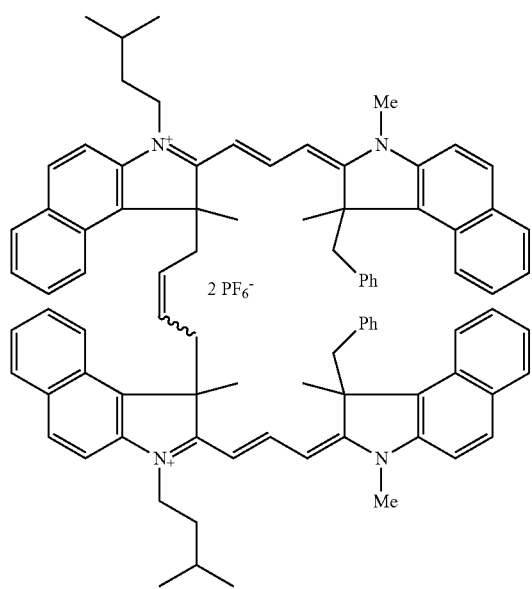
Compound no. 31
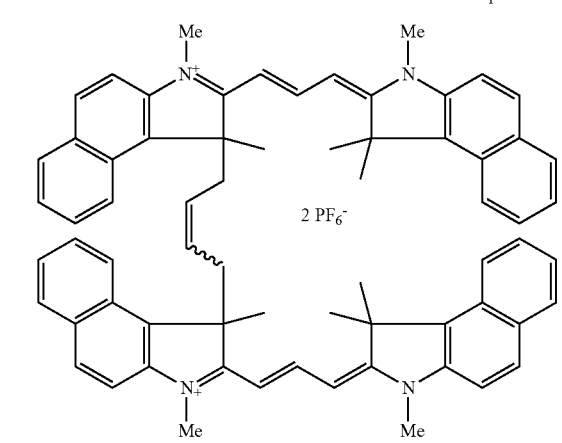
Compound no. 32
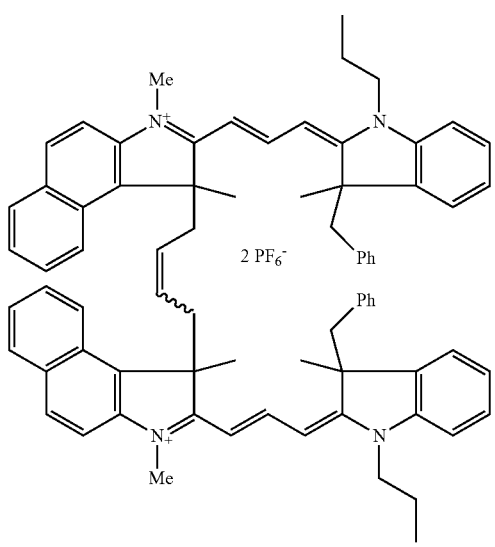
Compound no. 33
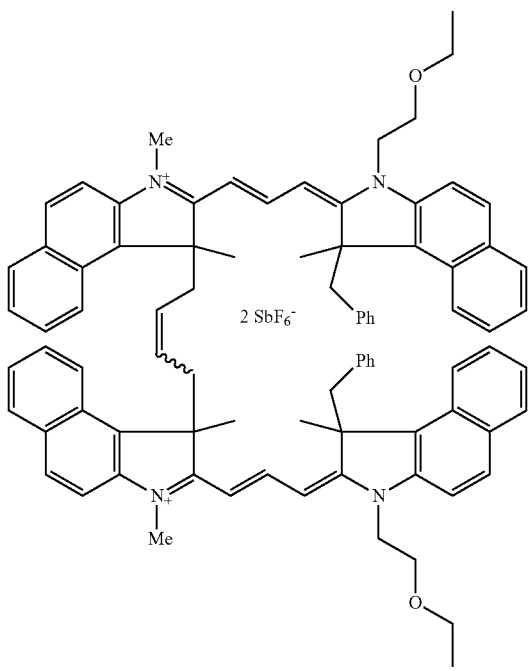

Compound no. 34
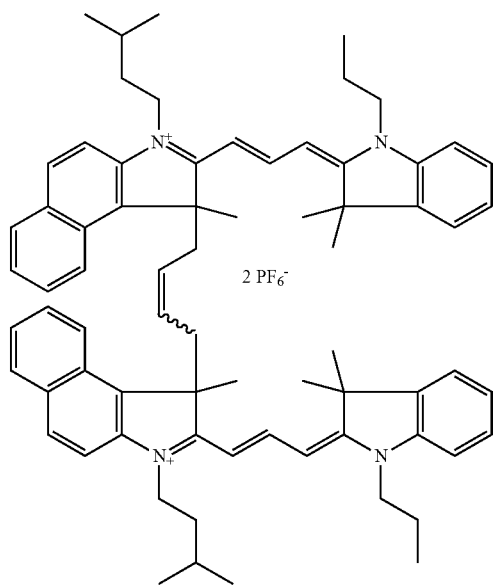
Compound no. 35
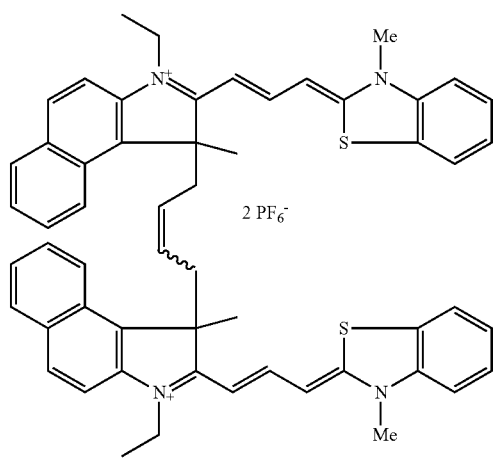
Compound no. 36
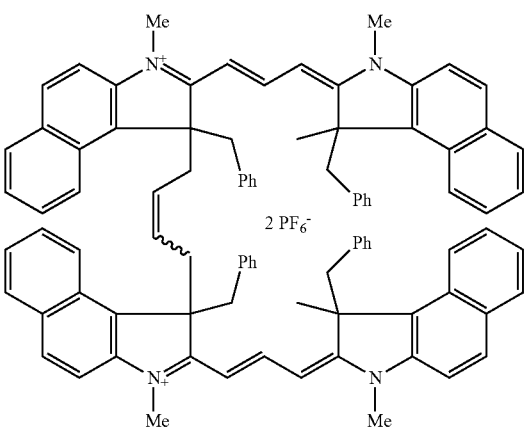
Compound no. 37
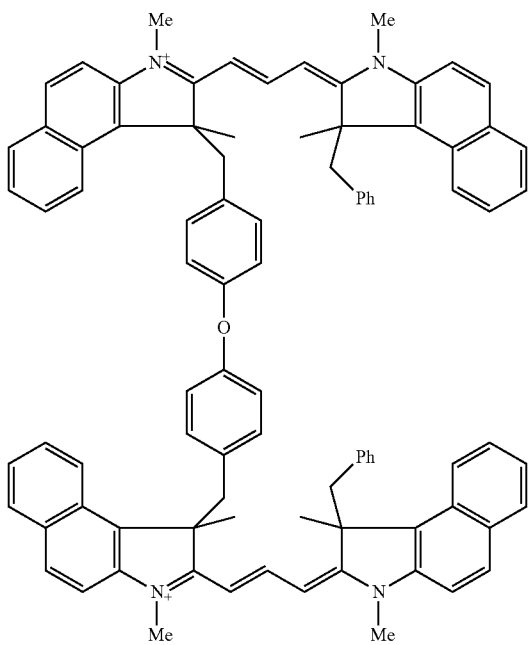
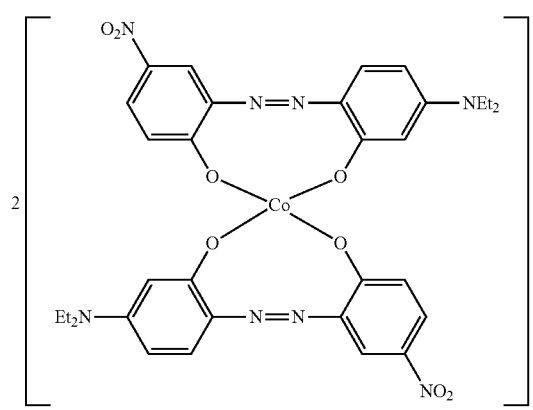

Compound no. 38

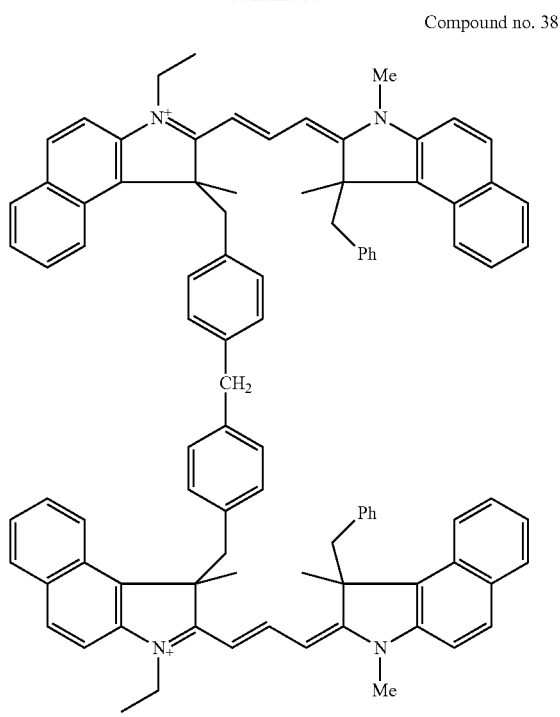

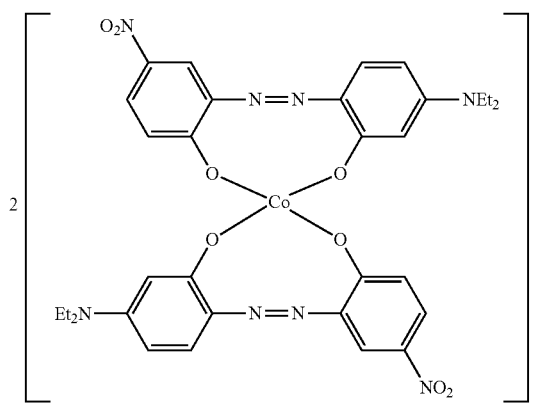

Compound no. 39

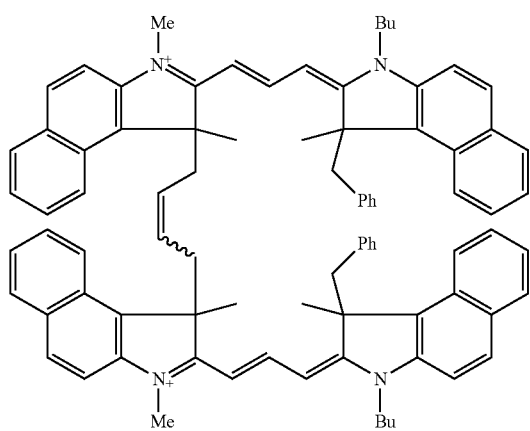

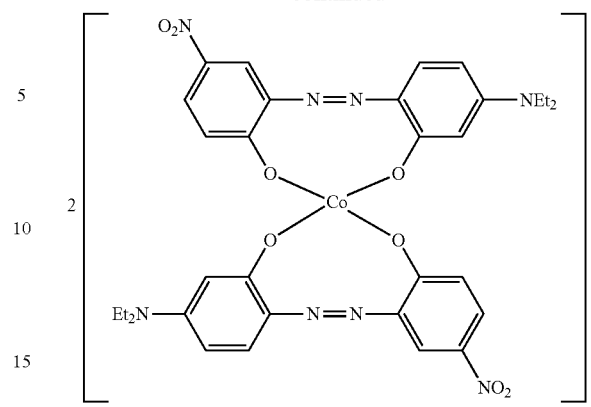

Method for Producing the Trimethine Cyanine Compounds of the Present Invention

The trimethine cyanine compounds of the present invention can be prepared by forming an indolium salt of formula (10) first, and coupling the indolium salt of formula (10) with an indolium derivative of formula (11) to form an trimethine cyanine compound of formula (12) as shown below, but in the present invention, its preparation is not limited thereto.

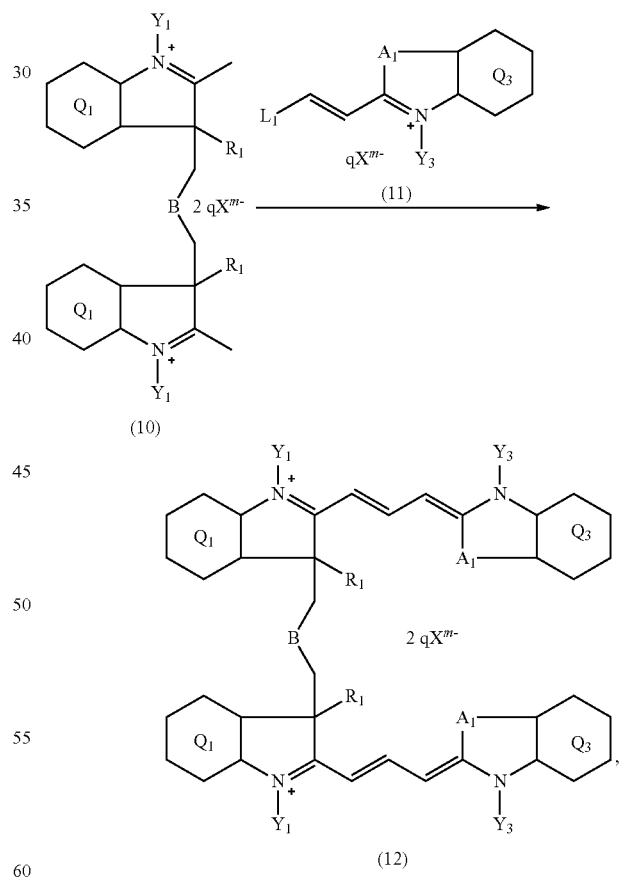

wherein $L_1$ is a leaving group, and other symbols are defined as above. The leaving group of the indolium derivative of formula (11) can be, but not limited to, chlorine, bromine, iodide, OTs (tosylate ester) or OAc (acetoxy), etc., or NPhAc (N-phenyl acetoxy), as shown in the general following formula (13).

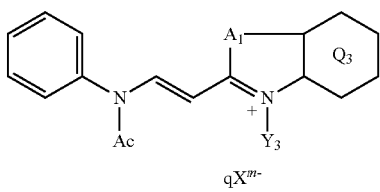

(13)

The indolium salt (10) is prepared, for example, by reacting indole compound (14) with a compound of formula (15) (wherein B is defined as above and $L_2$ is halogen atom or a leaving group) in the absence or presence of lewis acids (LA) compound (16). The reaction temperature can be in a range of from −30° C. to 180° C., preferably from 0° C. to 100° C. The reaction pressure can be in a range of from 0.5 Bar to 30 Bar, preferably from 1 Bar to 10 Bar.

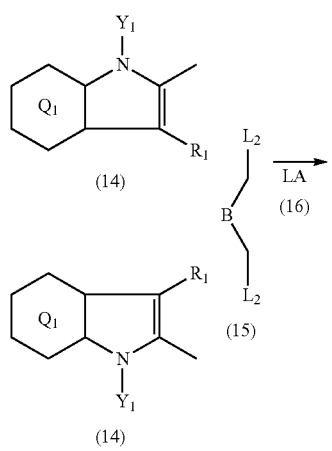

wherein each symbols is defined as above.

Compound (15) can be the compound (c) or (d) shown below,

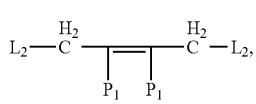

(c)

wherein $P_1$ and $P_2$ are the same or different and each represents a hydrogen atom or an organic group having 1 to 8 carbon atoms; alternatively $P_1$ and $P_2$ can be combined each other to form a 3- to 6-member carbon ring which can further be fused with a benzene ring;

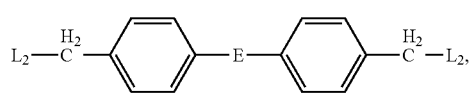

(d)

wherein E is an oxygen atom,

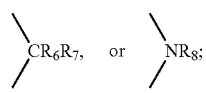

a sulfur atom, $R_6$, $R_7$ and $R_8$ each represents a hydrogen atom or a hydrocarbon group having 1 to 18 carbon atoms; alternatively $R_6$ and $R_7$ can be combined each other to form a 3- to 6-member carbon ring.

Examples of the Lewis acids (LA) compound (16) include, for example, zinc chloride, zinc bromide, zinc iodide, aluminum trichloride, etc.

The indolium salt (10) can also be prepared, for example, by the following reaction: reacting hydrazine compound (17) and ketone compound (18) to perform Fischer indole synthesis to obtain an indole compound (19), followed by N-alkylation and appropriated salt exchange to form the indolium salt (10).

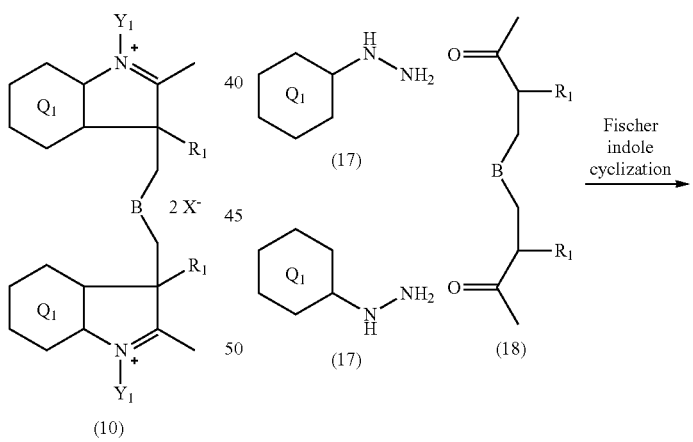

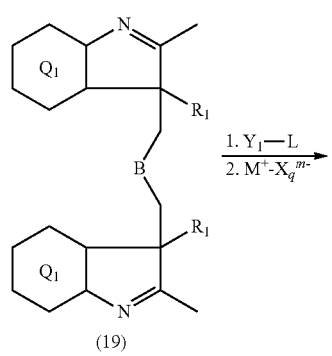

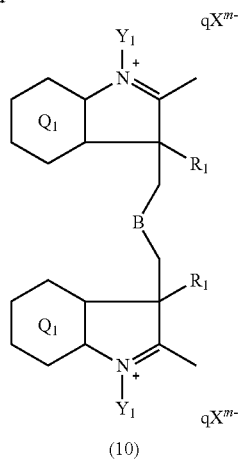

(10)

Generally, it is preferred to perform the aryl hydrazone ring closure of the Fischer indole synthesis in the presence of acid catalyst. As long as the acid catalyst which can form complexes with the organic ligand can be used. Common catalysts, for example, can be inorganic acid (such as $H_2SO_4$, HCl, $H_3PO_4$); organic acid (such as HCOOH, TsOH); Lewis acid (such as $ZnCl_2$, $TiCl_4$); the reaction temperature is in a range of from 40° C. to 120° C. in general. In the ring-closure process, aqueous solution can be used as the reacting solvent, such as $H_2SO_4$. Preferably, nitrogen can be aerated into the solution to prevent indole from oxidation in the air. The solvent can be alcohol (MeOH, EtOH); ether (dioxane, tetrahydrofuran (THF)), etc. or mixtures of two or more solvents in different proportions. The intermediate indole derivative then reacts with an alkylating agent shown as $Y_1$-L to form N-alkyated indole derivative. In the formula $Y_1$-L, $Y_1$ is defined as above, specifically $C_{1-8}$ alkyl, and L is a leaving group, specifically halogen (such as iodine, bromine or chlorine). Usually, the reaction temperature is in a range of from –0° C. to 110° C., and the reaction time is 1 to 48 hours.

The Optical Recording Media of the Present Invention

Another aspect of the present invention relates to an optical recording medium, which is characterized in that the recording layer of the optical recording media comprises the trimethine cyanine compound of formula (1) to (6). The optical recording media may further comprise an undercoat layer on the substrate as needed. As the method of making of the recording layer, there can be applied a thin film deposition generally performed such as vacuum evaporation, sputtering method, doctor blade method, cast method, spin coating, dipping method or the like, to apply the coating composition comprising the trimethine cyanine compound of the present invention to the substrate to form a thin firm. From the standpoint of productivity and cost, spin coating is preferable.

In the optical recording media of the present invention, the thickness of the recording layer is from 0.001 to 10 μm, preferably from 0.01 to 5 μm. In addition, the content of the trimethine cyanine compound in the optical layer is preferably from 50 to 100 wt %.

The optical layer may further formulate, besides the cyanine compound of the present invention, as needed, with those dye compounds ordinary used in optical recording layers, eg. other cyanine compounds, azo compounds, phthalocyanine compounds, or porphine compounds; resins (such as polyethylene, polyester, polystyrene, and polycarbonate); surfactants; antistatic agents; lubricants; flame retardants; radical scavengers (such as hindered amines); pit-formation accelerators (such as ferrocene derivatives); dispersants; antioxidants; crosslinkers; light fastness contributors; and others. The optical recording layer may further contain aromatic nitroso compounds, ammonium compounds, iminium compounds, bisiminium compounds, transition metal chelate compounds, or the like as a quencher of singlet oxygen or the like.

Further, it is also possible to use a binder in the coating composition. As the binder, the known material such as a polyvinyl alcohol, a polyvinyl pyrrolidone, a ketone resin, a nitrocellulose, cellulose acetate, polyvinyl butyral, a polycarbonate, etc. may be used. In the case of film forming by means of a spin coating method, the rotational speed is preferably from 500 to 5000 rpm. Furthermore, in some cases, after the spin coating, treatments by heat or applying a solvent vapor, can be considered.

As for the coating solvent can be used to form the recording layer by utilizing a coating method, such as doctor blade method, cast method, spin coating method, dipping method, especially spin coating method, it is not limited as long as the solvent does not attack the substrate. For example, there are ketone alcohol type solvents such as diacetone alcohol, 3-hydroxy-3-methyl-2-butanone and the like; cellosolve type solvents such as methyl cellosolve, ethyl cellosolve and the like; chain hydrocarbon type solvents such as n-hexane, n-octane and the like; ring hydrocarbon type solvents such as cyclohexane, methylcyclohexane, ethylcyclohexane, dimethylcyclohexane, n-butylcyclohexane, tert-butylcyclohexane, cyclooctane and the like; ether type solvents such as diisopropyl ether, dibutyl ether and the like; perfluoroalkylalcohol type solvents such as tetrafluoropropanol, octafluoropentanol, hexafluorobutanol and the like; hydroxy ester type solvents such as methyl lactate, ethyl lactate and the like, etc.

In addition to the above mentioned recording layer and undercoat layer, the optical recording media of the present invention may further comprise a reflective layer and a protective layer. The material of the reflective layer may be metals, such as gold, silver, aluminum, copper, platinum, etc. or alloys containing the above mentioned metals. From the standpoint of reflectivity and durability, gold, silver, aluminum or alloys containing those metals are preferable. The thickness of the reflective layer is 40-200 nm, preferably 60-150 nm. Methods such as sputtering, vacuum evaporation, ion plating and the like can be used to deposit the above mentioned metals or alloys thereof on the reflective layer to form a film.

In addition, the material for the protective layer is not limited as long as it can protect the recording layer and the reflective layer. For example, UV curable resin, silicon resin and the like may be used. The adhesives for laminating the protective layer can be UV curable resin, thermal melting adhesives and the like. For laminating, the recording layer can be fit on two substrates for lamination, or on a single substrate which is a dummy substrate having no recording layer.

The following experimental examples are provided in order to demonstrate and further illustrate various aspects of certain embodiments of the present invention and are not to be construed as limiting the scope thereof. Variations and modifications without departing from the spirit are still in the scope of the present invention. The following examples are provided to detail describe the present invention.

EXAMPLE

Example 1

Synthesis of Indolium Salt Intermediate (40)

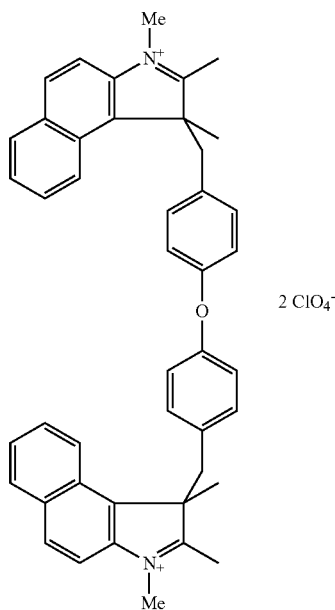

(40)

To a 500-ml glass flask equipped with a stirrer and aerated with nitrogen gas, 66 g of compound of the following formula (41), 53.4 g of compound of the following formula (42), 280 g of 1,2-dimethoxyethane and 69 g of zinc chloride were added and the resulting mixture was reacted at 80° C. for 2 hours.

After completion of the reaction, the mixture was cooled to 30□. To the cooled mixture, 240 ml of xylene and 220 g of 10% NaOH aqueous solution were added and then warmed to 55° C. and stirred for 1 hour. After cooling, the solid was filtered and washed by water, and then with 100 ml of xylene. The washing and filtering liquid were combined together and the mixture was separated into an aqueous layer and an organic layer. The aqueous layer was discarded and the organic layer was put into a flask and then cooled to 20° C. 158 g of 20% perchloric acid solution was added slowly into the flask with stirring for 1 hour. The resultant solid thus formed was filtered and washed with water and then IPA to give 87.8 g (71.9% in yield) of indolium salt (40) after drying.

Compound (41)

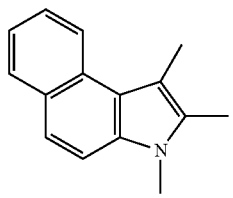

(41)

Compound (42)

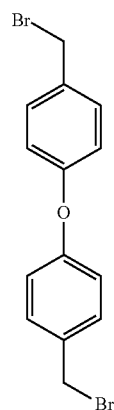

(42)

Analysis of indolium salt (40)
Melting point (DSC-TGA, 10° C./min ramp under nitrogen): 193.6° C. (decomposition).

Example 2

Synthesis of Compound No. 1

To a glass flask, 80 g of dimethyl formamide, 16.3 g of compound (40), 21.8 g of compound (43) (shown below) and 4.7 g triethylamine were added and the resulting mixture was reacted at 80° C. for 2 hours and then cooled to 60° C. to obtain a mixture. 540 ml of methanol in another flask was cooled to 5° C. in an ice-water bath. Then, the above mentioned mixture was added dropwise into the cooled methanol to crystallize. After filtration, the solid was obtained and then washed by methanol and dried under vacuum at 100° C. to get crude dye solid. 50 ml of dimethyl formamide was added to the crude dye solid and then warmed to 60° C. to obtain a dye solution. 450 ml of methanol in another flask was cooled to 5° C. in an ice-water bath. Then, the above mentioned dye solution was added dropwise into the cooled methanol to crystallize. After filtration, the solid thus obtained was then washed by methanol and dried under vacuum at 100° C. to give 19.2 g (67.0% in yield) of brown solid powder of Compound no. 1.

Compound (43)

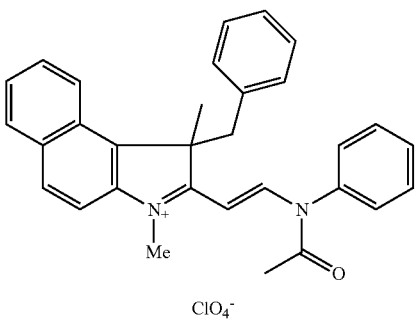

(43)

Analysis of Compound No. 1:
Optical property (in dichloromethane, $0.5 \times 10^{-5}$ g/ml): λmax 606 nm.
Melting point (DSC-TGA, 10° C./min ramp under nitrogen): 209.7° C. (decomposition).
Solubility (in TFP): 4.8%.

Example 3

Synthesis of Indolium Salt Intermediate (44)

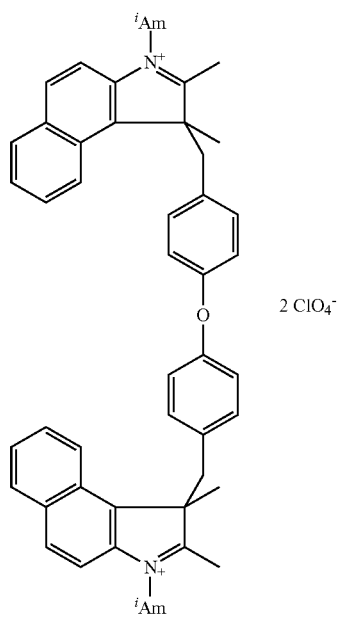

(44)

To a 500-ml glass flask equipped with a stirrer and aerated with nitrogen gas, 42 g of an intermediate of the following formula (45), 26.7 g of the intermediate (42), 180 g of 1,2-dimethoxyethane and 34.5 g of zinc chloride were added and the resulting mixture was reacted at 80° C. for 2 hours.

After completion of the reaction, the mixture was cooled to 30° C. To the cooled mixture, 160 ml of xylene and 150 g of 10% NaOH aqueous solution were added and then warmed to 55° C. with stirring for 1 hour. After cooled, the solid was filtered and washed by water, and then with 100 ml of xylene. The washing and filtering liquid were combined together and the mixture was separated into an aqueous layer and an organic layer. The aqueous layer was discarded and the organic layer was put into a flask and then cooled to 20° C. 79 g of 20% perchloric acid solution was added slowly into the flask and stirred for 1 hour. The resultant solid was filtered and wash with water and then IPA to give 43.4 g (62.6% in yield) of indolium salt (44) after dried.

Compound (45)

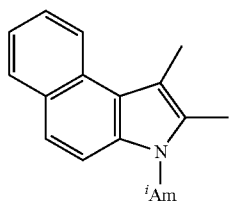

(45)

Analysis of Indolium Salt (44)

Melting point (DSC-TGA, 10° C./min ramp under nitrogen): 181.0° C. (decomposition).

Example 4

Synthesis of Compound No. 11

To a 500-ml glass flask equipped with a stirrer and aerated with nitrogen gas, 31.3 g of the intermediate (44), 39.9 g of intermediate (46) (shown below), 120 g of dimethyl formamide, and 7.8 g triethylamine were added and the resulting mixture was reacted at 80° C. for 2 hours. Upon cooled to 30° C., 420 ml of dichloromethane was added to the mixture and dissolved, the mixture was washed with 350 ml of water. 12.5 g of $KPF_6$/150 ml $H_2O$ was added into the mixture and then warmed to 40° C. with stirring for 30 minutes. The water layer was discarded and then 8 g of $KPF_6$/150 ml $H_2O$ was added and warmed to 40° C. and stirred for 30 minutes. The water layer was discarded again, and the organic layer was washed by 150 ml water twice and then condensed to obtain a concentrate. 160 ml of methanol was heated to 50° C. and then added into the concentrate and stirred for 30 minutes to crystallize. The crystal thus formed was filtered and redissolveed with 90 ml of dimethyl formamide by heating to 60° C. to obtain a dye solution. 720 ml of methanol in another flask was cooled to 5° C. in an ice-water bath. Then, the above mentioned dye solution was added dropwise into the cooled methanol to crystallize. After filtration, the solid was then washed by methanol and dried under vacuum at 100° C. to give 39.5 g (71.4% in yield) of brown solid powder of Compound no. 11.

Compound (46)

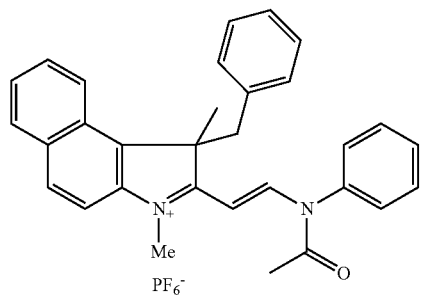

(46)

Analysis of Compound No. 11:

Optical property (in dichloromethane, $0.5 \times 10^{-5}$ g/ml): λmax 606 nm.

Melting point (DSC-TGA, 10° C./min ramp under nitrogen): 198.4° C. (decomposition).

Solubility (in TFP): 6.0%.

Example 5

Synthesis of Indolium Salt Intermediate (47)

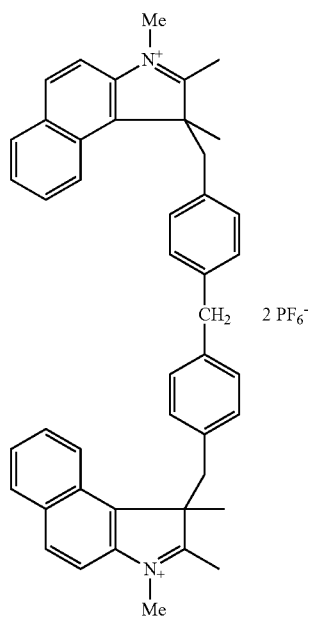

(47)

To a glass flask aerated with nitrogen gas, 4.4 g of compound (41), 3.5 g of compound of the following formula (48), 35 g of 1,2-dimethoxyethane and 4.6 g of zinc chloride were added and the resulting mixture was reacted at 80° C. for 2 hours. Then, 40 g of xylene, 35 g of water and 7 g of ammonia solution were added and stirred for 1 hour. After filtration, the water layer was discarded. The organic layer was added with 10 g of acetic acid/water mixture (1:1) and then a mixture of 3.7 g of $KPF_6$ and 19 g of $H_2O$ and stirred for 1 hour. After filtration, the solid powder thus obtained was washed by methanol and water in sequence and dried under vacuum at 100° C. to give 5.6 g (62.0% in yield) of Compound (47).

Compound (48)

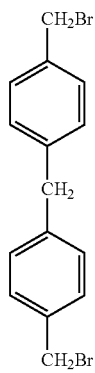

(48)

Analysis of Compound (47):
Melting point (DSC-TGA, 10° C./min ramp under nitrogen): 202.0° C. (decomposition).

Example 6

Synthesis of Compound No. 13

To a glass flask aerated with nitrogen gas, 4.5 g of the intermediate (47), 6.05 g of intermediate (49) (shown below), 25 g of dimethyl formamide, and 1.2 g of triethylamine were added and the resulting mixture was reacted at 80° C. for 2 hours. Stop heating, the mixture was slowly added into 160 ml of methanol in ice-water bath and stirred for 30 minutes. After filtration, the solid thus obtained was then washed with methanol, and dried under vacuum at 100° C. to give 5.2 g (62.0% in yield) of brown solid powder of Compound no. 13.

Compound (49)

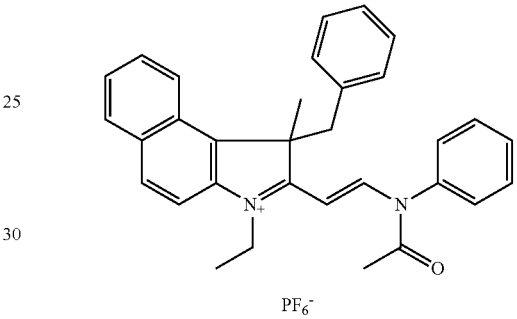

(49)

Analysis of Compound No. 13:
Optical property (in dichloromethane, $0.5 \times 10^{-5}$ g/ml): λmax 606 nm.
Melting point (DSC-TGA, 10° C./min ramp under nitrogen): 209.7° C. (decomposition).
Solubility (in TFP): 3.6%.

Example 7

Synthesis of Indolium Salt Intermediate (50)

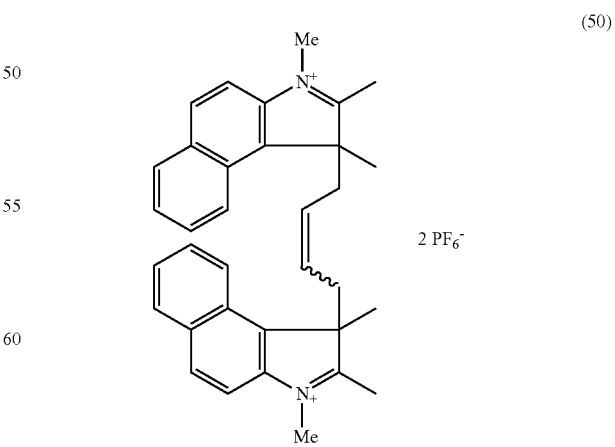

(50)

To a 500-ml glass flask equipped with a stirrer and aerated with nitrogen gas, 66 g of the intermediate (41) (shown in Example 1), 32.1 g of 1,4-dibromo-2-butene and 310 g of 1,2-dimethoxyethane were added and the resulting mixture was reacted at 80° C. for 4 hours. After concentrated, 400 ml of dichloromethane was added into the concentrate and dissolved, and then 70 g of $KPF_6$/300 ml $H_2O$ was also added into the mixture and warmed to 40° C. and stirred for 30 minutes. The water layer was discarded and then 35 g of $KPF_6$/250 ml $H_2O$ was added and warmed to 40° C. and stirred for another 30 minutes. The water layer was discarded again, and the organic layer was washed with 150 ml water twice and then concentrated to obtain a concentrate. 260 ml of methanol was added into the concentrate and heated to 40° C. and stirred for 30 minutes to crystallize. After filtration, the solid thus obtained was washed with methanol and dried under vacuum at 100° C. to give 71.7 g (62.7% in yield) of solid of Compound no. 50.

Analysis of Compound No. 50:

Melting point (DSC-TGA, 10° C./min ramp under nitrogen): 166.12° C. (decomposition).

Example 8

Synthesis of Compound No. 26

To a glass flask equipped with a stirrer and aerated with nitrogen gas, 45.8 g of the compound (50), 70.8 g of the compound (46) (shown in Example 4), 260 g of dimethyl formamide, and 15.1 g of triethylamine were added and the resulting mixture was reacted at 80° C. for 2 hours. Stop heating, the mixture was slowly added into 1400 ml of methanol in ice-water bath and stirred for 30 minutes. After filtration, the solid was obtained and then washed with methanol, and dried under vacuum at 100° C. to give 71.2 g (86% in yield) of brown solid powder of Compound no. 26.

Analysis of Compound No. 26:

Optical property (in dichloromethane, $0.5\times10^{-5}$ g/ml): λmax 604 nm.

Melting point (DSC-TGA, 10° C./min ramp under nitrogen): 197.8° C. (decomposition).

Solubility (in TFP): 5.3%.

Example 9

Synthesis of Indolium Salt Intermediate (51)

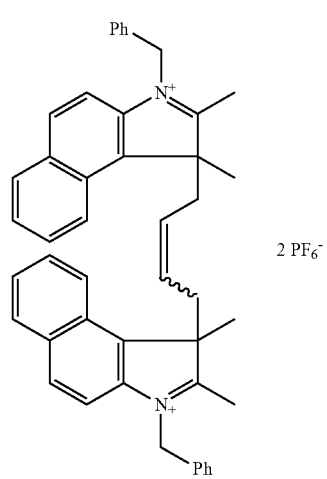

(51)

To a glass flask aerated with nitrogen gas, 6.0 g of the intermediate (52) ( ), 2.1 g of 1,4-dibromo-2-butene and 40 g of 1,2-dimethoxyethane were added and the resulting mixture was reacted at 80° C. for 4 hours. After concentrated, 160 ml of dichloromethane was added into the concentrate and dissolved. 8.3 g of $KPF_6$/80 ml $H_2O$ was also added into the mixture and warmed to 40° C. and stirred for 30 minutes to exchange salt. The water layer was discarded and then 8.3 g of $KPF_6$/80 ml $H_2O$ was added and then warmed to 40° C. and stirred for another 30 minutes to exchange salt again. The water layer was discarded again, and the organic layer was washed by 100 ml water twice and then concentrated to obtain a concentrate. 160 ml of methanol was added to the concentrate and heated to 40° C. with stirring for 30 minutes to crystallize. After filtration, the solid powder thus obtained was washed by methanol and dried under vacuum at 100° C. to give 4.8 g (52.8% in yield) of Compound no. 51.

Compound (52)

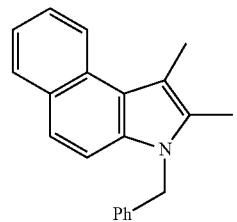

(52)

Analysis of Compound (51):

Melting point (DSC-TGA, 10° C./min ramp under nitrogen): 202.6° C.

Example 10

Synthesis of Compound No. 29

To a glass flask aerated with nitrogen gas, 3.7 g of the compound (51), 4.7 g of the compound (46) (shown in Example 4), 30 g of dimethyl formamide, and 0.9 g of triethylamine were added and the resulting mixture was reacted at 80° C. for 2 hours. Stop heating, the mixture was slowly added into 180 ml of methanol in ice-water bath and stirred for 30 minutes. After filtration, the solid thus obtained was washed by methanol, and dried under vacuum at 100° C. to give 3.8 g (62.8% in yield) of brown solid powder of Compound no. 29.

Analysis of Compound No. 29:

Optical property (in dichloromethane, $0.5\times10^{-5}$ g/ml): λmax 604 nm.

Melting point (DSC-TGA, 10° C./min ramp under nitrogen): 194.2° C. (decomposition).

Solubility (in TFP): 5.3%.

Example 11

Synthesis of Indolium Salt Intermediate (53)

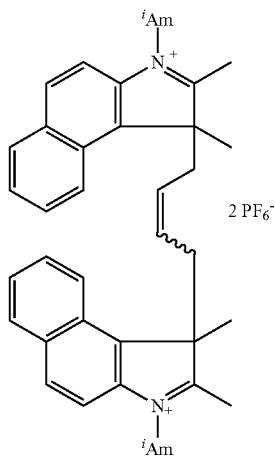

To a glass flask aerated with nitrogen gas, 6.0 g of compound (45) (shown in Example 3), 2.3 g of 1,4-dibromo-2-butene and 30 g of 1,2-dimethoxyethane were added and the resulting mixture was reacted at 80° C. for 4 hours. After concentrated, 160 ml of dichloromethane was added into the concentrate and dissolved. 8.3 g of KPF$_6$/80 ml H$_2$O was also added into the mixture and warmed to 40° C. and stirred for 30 minutes. The water layer was discarded and then 8.3 g of KPF$_6$/80 ml H$_2$O was added and then warmed to 40° C. with stirring for another 30 minutes. The water layer was discarded again, and the organic layer was washed with 100 ml water twice and then concentrated to obtain a concentrate. 160 ml of methanol was added into the concentrate and heated to 40° C. with stirring for 30 minutes to crystallize. After filtration, the solid thus obtained was then washed with methanol and dried under vacuum at 100° C. to give 4.5 g (47.8% in yield) of Compound (53).

Analysis of Compound (53):

Melting point (DSC-TGA, 10° C./min ramp under nitrogen): 200.3° C.

Example 12

Synthesis of Compound no. 34

To a glass flask aerated with nitrogen gas, 2.1 g of compound (53), 2.36 g of compound (54) ( ), 15 g of dimethyl formamide, and 0.8 g of triethylamine were added and the resulting mixture was reacted at 80° C. for 2 hours. Stop heating, the mixture was slowly added into 180 ml of methanol in ice-water bath and stirred for 30 minutes. After filtration, the solid thus obtained was then washed by methanol, and dried under vacuum at 100° C. to give 1.76 g (57.5% in yield) of brown solid powder of Compound no. 34.

Compound (54)

(54)

PF$_6^-$

Analysis of Compound No. 34:

Optical property (in dichloromethane, $0.5 \times 10^{-5}$ g/ml): λmax 578 nm.

Melting point (DSC-TGA, 10° C./min ramp under nitrogen): 209.7° C. (decomposition).

Solubility (in TFP): 4.17%.

Experimental Example 1

0.3 g of Compound no. 1 and 0.7 g of Compound no. 55 were added into 90 g of 1,1,2,2-tetrafluoropropanol and stirred at room temperature for 4 hours to form a homogeneous dye solution (weight ratio of Compound no. 1 to Compound no. 55 was 30:70). The solution was filtered by Teflon filter membrane having a pore size of 0.1 mm. The resultant filtrate was spin-coated onto a circular transparent polycarbonate substrate having a diameter of 120 mm and a thickness of 0.6 mm first at 450 rpm for 5 seconds and then at 4500 rpm for 10 seconds. The substrate was formed with a spiral trench wherein the trench depth was 160 nm, half height width was 340 nm, a distance between two adjacent trenches was 740 nm. The trench conformed to the regulation specified in DVD forum specification "DVD-R for General, Physical Specification ver. 2.0" and had a maximum absorptive wavelength absorbance of 0.52 when measured by Lambda 25 UV/vis Spectrometer (Perkin Elmer). The spin-coated substrate was placed in a heat circulation oven at a temperature of 80□ for 20 minutes to remove solvent contained therein to form a dye layer. Then an Ag film having a thickness of 100 nm was formed on the dye layer by sputtering (Swivel Sputter, manufactured by Baizers Co.,) (Ag target: manufactured by Solar Applied Materials Technology Corp., Taiwan). On the inner periphery of the circular substrate was evenly coated with 1 g of UV curable acrylic adhesive (Product Cat. No. SD-698, manufactured by Dainippon Ink and Chemicals Incorporated, DIC) and then covered with a circular transparent polycarbonate substrate having a diameter of 120 mm and a thickness of 0.6 mm. The substrate was accelerative spun to 3000 rpm for 5 seconds and the acrylic resin was cured by illuminating with a UV lamp (Product Cat. No. UVM-201, manufactured by Hanky Corporation, Taiwan) to form a disc having a bonding layer.

Certain information was recorded on the disc by using DVD Tester ODU-1000 (wavelength 660 nm, NA 0.60) at a linear speed of 56 m/s (16×DVD-R based linear speed) by a power of from 30 mW to 50 mW and then scanned the information recorded on the disc at a linear speed of 3.49 m/s. The lower the jitter value is, the better the recording power is. The results were summarized in Table 1.

Compound no. 55

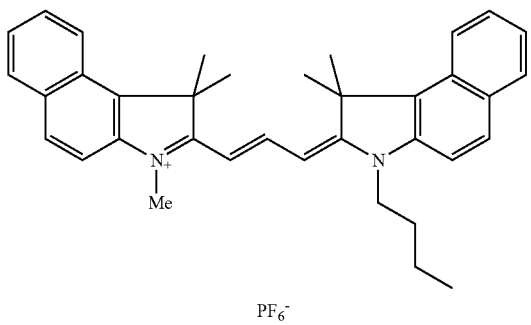

(55)

PF$_6^-$

Experimental Example 2

A recoding medium was prepared by the same procedures described in Experimental Example 1 except that the amount of Compound No. 1 and No. 55 were both changed to 0.5 g (weight ratio of Compound No. 1 to Compound No. 55 was 5:5).

The property of the resultant recording medium was elevated the same as in Experimental Example 1 to give the 16× recording property and the results were summarized in Table 1.

Experimental Example 3

A recoding medium was prepared by the same procedures described in Experimental Example 1 except that the amount of Compound No. 1 and Compound No. 55 were changed to 0.7 g and 0.3 g, respectively (weight ratio of Compound No. 1 to Compound No. 55 was 7:3).

The property of the resultant recording medium was elevated the same as in Experimental Example 1 to give the 16× recording property and the results were summarized in Table 1.

Experimental Example 4

A recoding medium was prepared by the same procedures described in Experimental Example 1 except that Compound No. 1 was changed to Compound No. 11 in an amount of 0.3 g and the amount of Compound No. 55 was changed to 0.7 g (weight ratio of Compound No. 11 to Compound No. 55 was 3:7).

The property of the resultant recording medium was elevated the same as in Experimental Example 1 to give the 16× recording property and the results were summarized in Table 1.

Experimental Example 5

A recoding medium was prepared by the same procedures described in Experimental Example 1 except that Compound No. 1 was changed to Compound No. 11 in an amount of 0.5 g and the amount of Compound No. 55 was changed to 0.5 g (weight ratio of Compound No. 11 to Compound No. 55 was 5:5).

The property of the resultant recording medium was elevated the same as in Experimental Example 1 to give the 16× recording property and the results were summarized in Table 1.

Experimental Example 6

A recoding medium was prepared by the same procedures described in Experimental Example 1 except that Compound No. 1 was changed to Compound No. 11 in an amount of 0.7 g and the amount of Compound No. 55 was changed to 0.3 g (weight ratio of Compound No. 11 to Compound No. 55 was 7:3).

The property of the resultant recording medium was elevated the same as in Experimental Example 1 to give the 16× recording property and the results were summarized in Table 1.

Experimental Example 7

A recoding medium was prepared by the same procedures described in Experimental Example 1 except that Compound No. 1 was changed to Compound No. 19 in an amount of 0.3 g and the amount of Compound No. 55 was changed to 0.7 g (weight ratio of Compound No. 19 to Compound No. 55 was 3:7).

The property of the resultant recording medium was elevated the same as in Experimental Example 1 to give the 16× recording property and the results were summarized in Table 1.

Experimental Example 8

A recoding medium was prepared by the same procedures described in Experimental Example 1 except that Compound No. 1 was changed to Compound No. 19 in an amount of 0.5 g and the amount of Compound No. 55 was changed to 0.5 g (weight ratio of Compound No. 19 to Compound No. 55 was 5:5).

The property of the resultant recording medium was elevated the same as in Experimental Example 1 to give the 16× recording property and the results were summarized in Table 1.

Experimental Example 9

A recoding medium was prepared by the same procedures described in Experimental Example 1 except that Compound No. 1 was changed to Compound No. 19 in an amount of 0.7 g and the amount of Compound No. 55 was changed to 0.3 g (weight ratio of Compound No. 19 to Compound No. 55 was 7:3).

The property of the resultant recording medium was elevated the same as in Experimental Example 1 to give the 16× recording property and the results were summarized in Table 1.

Experimental Example 10

A recoding medium was prepared by the same procedures described in Experimental Example 1 except that Compound No. 1 was changed to Compound No. 29 in an amount of 0.3 g and the amount of Compound No. 55 was changed to 0.7 g (weight ratio of Compound No. 29 to Compound No. 55 was 3:7).

The property of the resultant recording medium was elevated the same as in Experimental Example 1 to give the 16× recording property and the results were summarized in Table 1.

Experimental Example 11

A recoding medium was prepared by the same procedures described in Experimental Example 1 except that Compound No. 1 was changed to Compound No. 29 in an amount of 0.5 g and the amount of Compound No. 55 was changed to 0.5 g (weight ratio of Compound No. 29 to Compound No. 55 was 5:5).

The property of the resultant recording medium was elevated the same as in Experimental Example 1 to give the 16× recording property and the results were summarized in Table 1.

Experimental Example 12

A recoding medium was prepared by the same procedures described in Experimental Example 1 except that Compound No. 1 was changed to Compound No. 29 in an amount of 0.7 g and the amount of Compound No. 55 was changed to 0.3 g (weight ratio of Compound No. 29 to Compound No. 55 was 7:3).

The resultant recording medium was elevated the same as in Experimental Example 1 to give the 16× recording property and the results were summarized in Table 1.

Comparative Example 1

1 g of Compound no. 56 was added into 90 g of 1,1,2,2-tetrafluoropropanol and stirred at room temperature for 4 hours to form a homogeneous dye solution. The solution was filtered by Teflon filter membrane and then produced to be a recording medium as the same procedures recited in Experimental Example 1.

The resultant recording medium was elevated the same as in Experimental Example 1 to give the 16× recording property and the results were summarized in Table 1.

Compound no. 56

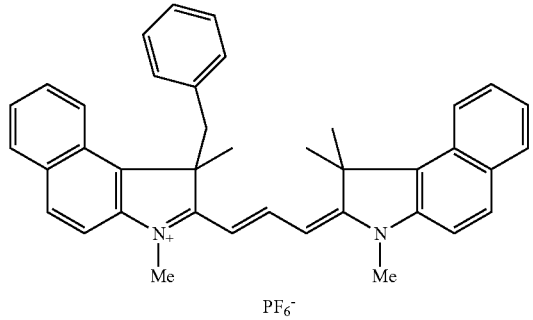

TABLE 1

| | Formula of the recording layer | | | 16X Maximum Recording Power | |
|---|---|---|---|---|---|
| | Compound No. | Weight ratio (%) | | Laser Power | Jitter value |
| Experimental Example 1 | 1 | 55 | 30 70 | 47 | 8.4 |
| Experimental Example 2 | 1 | 55 | 50 50 | 43 | 8.1 |
| Experimental Example 3 | 1 | 55 | 70 30 | 41 | 7.9 |
| Experimental Example 4 | 11 | 55 | 30 70 | 47 | 8.1 |
| Experimental Example 5 | 11 | 55 | 50 50 | 41 | 7.9 |
| Experimental Example 6 | 11 | 55 | 70 30 | 38 | 7.8 |
| Experimental Example 7 | 19 | 55 | 30 70 | 45 | 8.1 |
| Experimental Example 8 | 19 | 55 | 50 50 | 41 | 7.9 |
| Experimental Example 9 | 19 | 55 | 70 30 | 39 | 7.8 |
| Experimental Example 10 | 29 | 55 | 30 70 | 43 | 8.3 |
| Experimental Example 11 | 29 | 55 | 50 50 | 41 | 8.1 |
| Experimental Example 12 | 29 | 55 | 70 30 | 39 | 7.8 |
| Comparative Example 1 | 56 | | 100 | 55 | 8.5 |

It is to be understood that, although the invention has been described in conjunction with the detailed description thereof, the foregoing description is intended to be illustrative and not to limit the scope of the invention, which is defined by the scope of the appended claims. Other aspects, advantages and modifications are within the scope of the following claims.

What is claimed is:

1. A trimethine cyanine compound represented by the following formula (1):

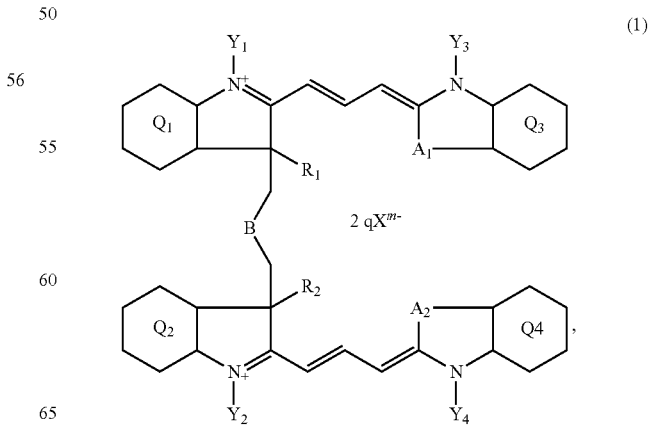

wherein:

$Q_1$, $Q_2$, $Q_3$, and $Q_4$ are the same or different and each represents a substituted or unsubstituted benzene ring or naphthalene ring;

$A_1$ and $A_2$ are the same or different and each represents a group of formulae

an oxygen atom, or a sulfur atom;

$Y_1$, $Y_2$, $Y_3$, and $Y_4$ are the same or different and each represents an organic group having 1 to 18 carbon atoms;

$R_1$, $R_2$, $R_3$, $R_4$, and $R_5$ are the same or different and each represents a hydrocarbon group having 1-18 carbon atoms, which is substituted or unsubstituted; alternatively $R_3$ and $R_4$ can form a 3- to 6-member carbon ring which can further be fused with a benzene ring;

B is a divalent linking group represented by the following formula (a) or (b):

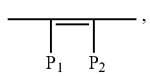
(a)

wherein:

$P_1$ and $P_2$ are the same or different and each represents a hydrogen atom or an organic group having 1 to 8 carbon atoms; alternatively $P_1$ and $P_2$ can form a 3- to 6-member carbon ring which can further be fused with a benzene ring;

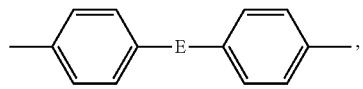
(b)

wherein:

E is an oxygen atom, a sulfur atom,

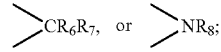

$R_6$, $R_7$ and $R_8$ each represents a hydrogen atom or a hydrocarbon group having 1 to 18 carbon atoms; alternatively $R_6$ and $R_7$ can form a 3- to 6-member carbon ring;

$X^{m-}$ represents an anion having m valence;

m represents an integral of 1, 2, or 3;

q represents the number attributing the compound with electronic neutrality.

2. The trimethine cyanine compound according to claim 1, which is the compound represented by the following formula (2):

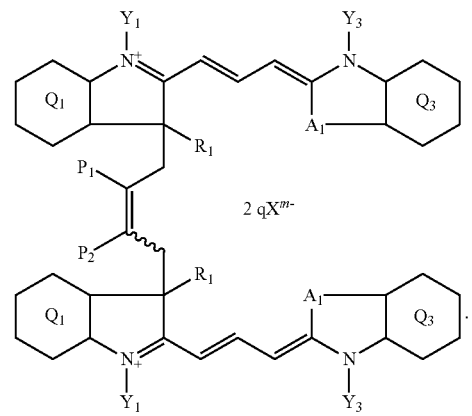

3. The trimethine cyanine compound according to claim 2, which is the compound represented by the following formula (3):

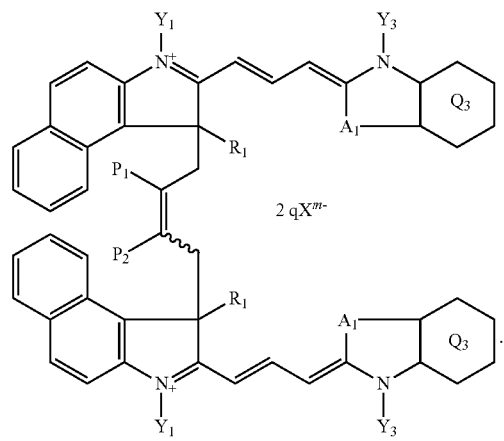

4. The trimethine cyanine compound according to claim 1, which is the compound represented by the following formula (4):

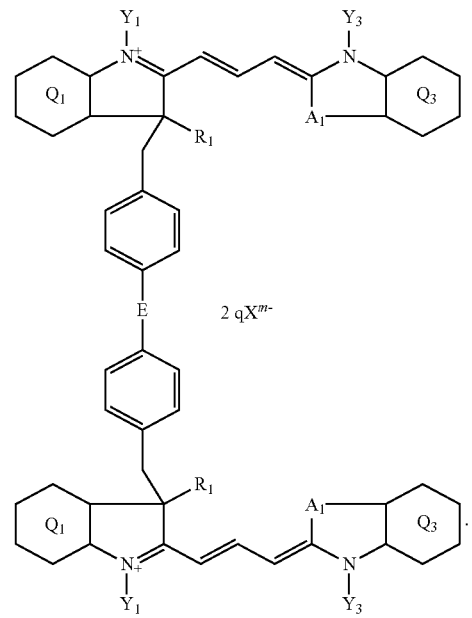

5. The trimethine cyanine compound according to claim 4, which is the compound represented by the following formula (5):

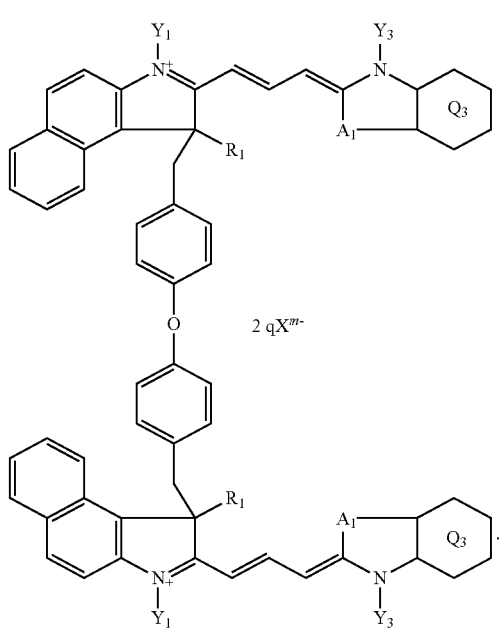

6. The trimethine cyanine compound according to claim 4, which is the compound represented by the following formula (6):

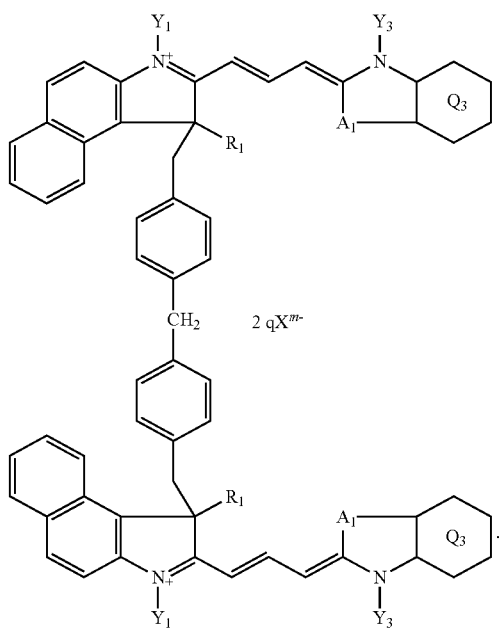

7. An optical recording media, which is characterized in that the recording layer of the optical recording media comprises the trimethine cyanine compound according to claim 1.

8. The optical recording media of claim 7, wherein the content of the trimethine cyanine compound in the recording layer is 20 to 100 wt %.

9. A method for producing the trimethine cyanine compound according to claim 1, comprising coupling an indolium salt of formula (10) with an indolium derivative of formula (11) to form an trimethine cyanine compound of formula (12),

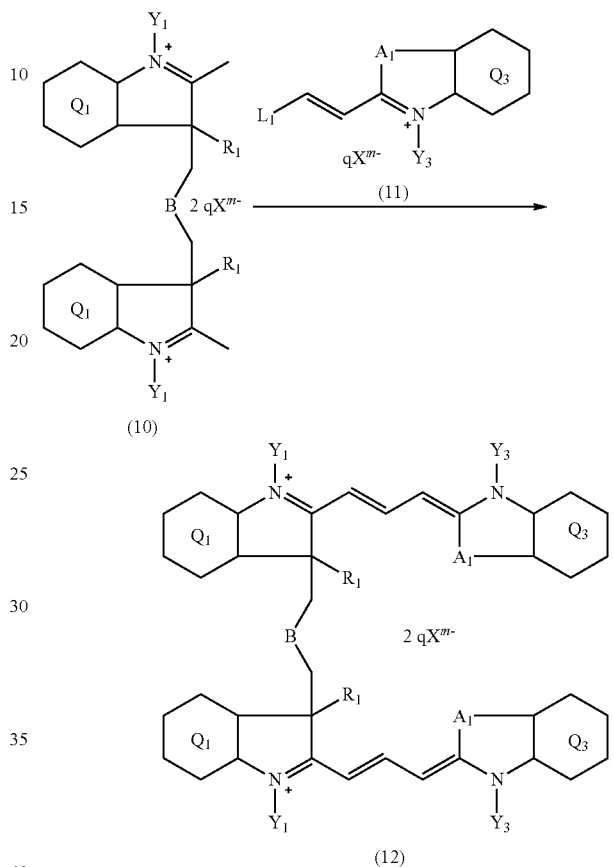

wherein
L₁ is a leaving group;
Q₁, and Q₃ are the same or different and each represents a substituted or unsubstituted benzene ring or naphthalene ring;
A₁ represents a group of formulae

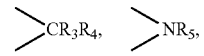

an oxygen atom, or a sulfur atom;
R₁, R₃, R₄, and R₅ are the same or different and each represents a hydrocarbon group having 1-18 carbon atoms, which is substituted or unsubstituted;
Y₁ and Y₃ are the same or different and each represents an organic group having 1 to 18 carbon atoms;
B is a divalent linking group represented by the following formula (a) or (b):

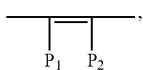

(a) wherein:
$P_1$ and $P_2$ are the same or different and each represents a hydrogen atom or an organic group having 1 to 8 carbon atoms; alternatively $P_1$ and $P_2$ can form a 3- to 6-member carbon ring which can further be fused with a benzene ring;

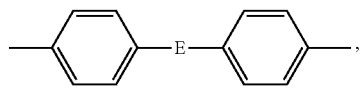

(b) wherein:
E is an oxygen atom, a sulfur atom,

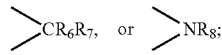

$R_6$, $R_7$ and $R_8$ each represents a hydrogen atom or a hydrocarbon group having 1 to 18 carbon atoms; alternatively $R_6$ and $R_7$ can form a 3- to 6-member carbon ring;
$X^{m-}$ represents an anion having m valence;
m represents an integral of 1, 2, or 3; and
q represents the number attributing the compound with electronic neutrality.

* * * * *